US009961216B2

(12) United States Patent
Norota

(10) Patent No.: US 9,961,216 B2
(45) Date of Patent: May 1, 2018

(54) IMAGE PROCESSING APPARATUS, IMAGE PROCESSING SYSTEM, AND IMAGE PROCESSING METHOD FOR GENERATING A SETTING SCREEN TO BE DISPLAYED BY AN INFORMATION TERMINAL ACCORDING TO AN EQUIPMENT CONFIGURATION OF THE IMAGE PROCESSING APPARATUS

(71) Applicant: Ken Norota, Kanagawa (JP)

(72) Inventor: Ken Norota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/047,895

(22) Filed: Feb. 19, 2016

(65) Prior Publication Data

US 2016/0269576 A1    Sep. 15, 2016

(30) Foreign Application Priority Data

Mar. 12, 2015 (JP) ................. 2015-049286

(51) Int. Cl.
| | | |
|---|---|---|
| H04N 1/00 | (2006.01) | |
| G06F 3/12 | (2006.01) | |
| H04N 1/46 | (2006.01) | |

(52) U.S. Cl.
CPC ....... *H04N 1/00307* (2013.01); *G06F 3/1205* (2013.01); *G06F 3/1232* (2013.01); *G06F 3/1292* (2013.01); *H04N 1/46* (2013.01); *G06F 3/1231* (2013.01); *H04N 1/00822* (2013.01); *H04N 2201/006* (2013.01); *H04N 2201/0094* (2013.01)

(58) Field of Classification Search
None
See application file for complete search history.

(56) References Cited

U.S. PATENT DOCUMENTS

| 9,036,178 B2 | 5/2015 | Norota | |
|---|---|---|---|
| 2004/0257604 A1* | 12/2004 | Morooka | G06F 3/1204 358/1.14 |
| 2005/0180793 A1* | 8/2005 | Nishiguchi | G06K 15/00 400/76 |
| 2006/0209338 A1* | 9/2006 | Dohi | G06F 21/10 358/1.15 |
| 2007/0019657 A1* | 1/2007 | Takayama | H04L 41/22 370/401 |
| 2011/0199640 A1* | 8/2011 | Shirai | G06F 3/1204 358/1.15 |

(Continued)

FOREIGN PATENT DOCUMENTS

| JP | 2007-074162 | 3/2007 |
|---|---|---|
| JP | 2013-157848 | 8/2013 |
| JP | 2014-078927 | 5/2014 |

*Primary Examiner* — Miya J Williams
(74) *Attorney, Agent, or Firm* — IPUSA, PLLC

(57) ABSTRACT

An image processing apparatus includes a receiving unit configured to receive first setting information from an information terminal; a providing unit configured to provide a setting screen for setting second setting information to the information terminal, based on the received first setting information; and an image processing unit configured to execute image processing based on the received first setting information and the second setting information set by the setting screen.

16 Claims, 16 Drawing Sheets

(56) References Cited

U.S. PATENT DOCUMENTS

| | | | |
|---|---|---|---|
| 2011/0292445 A1* | 12/2011 | Kato | G06F 3/1222 |
| | | | 358/1.15 |
| 2014/0082544 A1 | 3/2014 | Umeizumi | |
| 2014/0253965 A1* | 9/2014 | Asai | G06F 3/1205 |
| | | | 358/1.15 |
| 2014/0355047 A1* | 12/2014 | Lee | G06F 3/1292 |
| | | | 358/1.15 |
| 2015/0212769 A1 | 7/2015 | Norota et al. | |
| 2015/0222785 A1 | 8/2015 | Norota | |

* cited by examiner

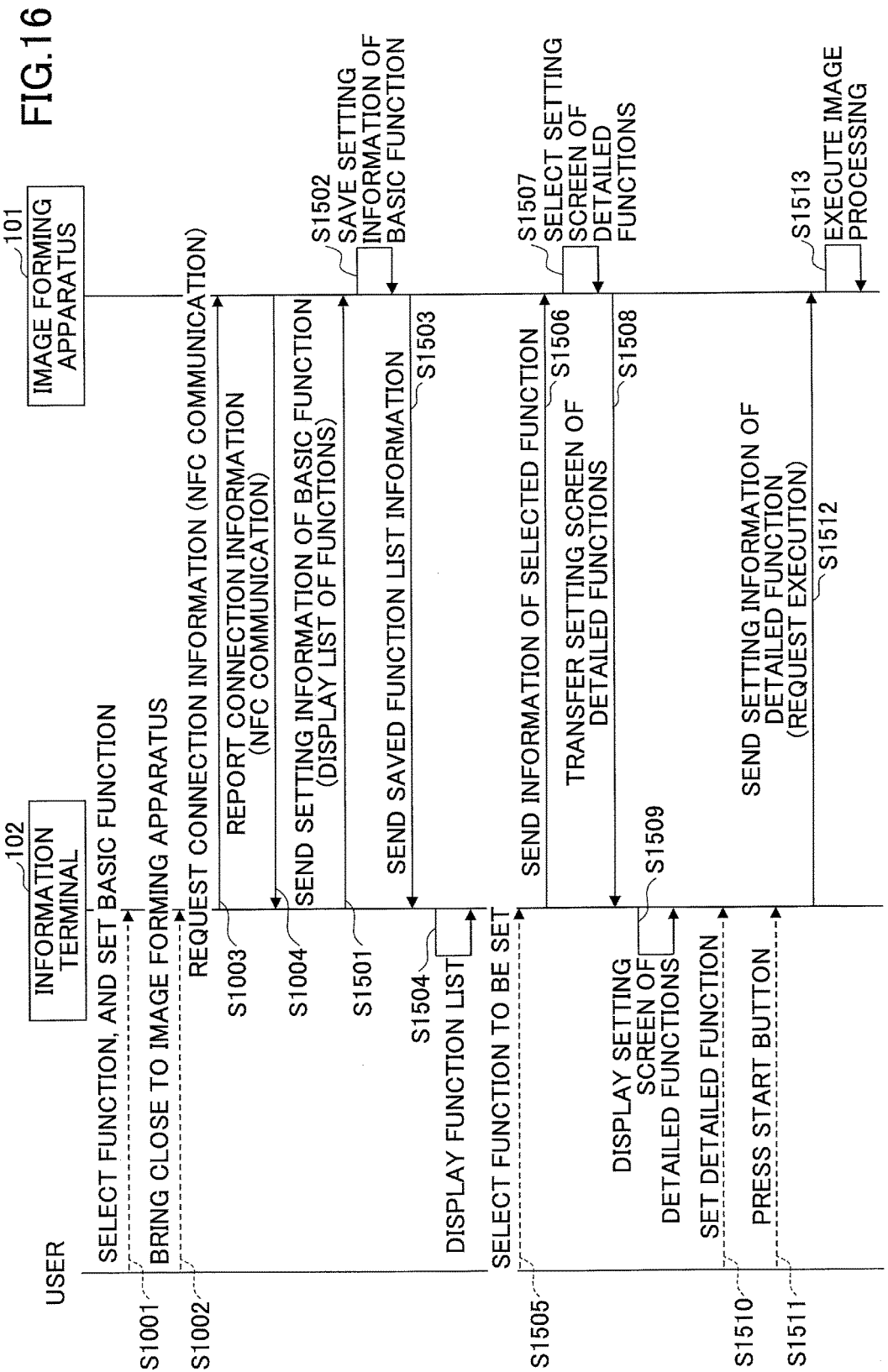

IMAGE PROCESSING APPARATUS, IMAGE PROCESSING SYSTEM, AND IMAGE PROCESSING METHOD FOR GENERATING A SETTING SCREEN TO BE DISPLAYED BY AN INFORMATION TERMINAL ACCORDING TO AN EQUIPMENT CONFIGURATION OF THE IMAGE PROCESSING APPARATUS

BACKGROUND OF THE INVENTION

1. Field of the Invention

The present invention relates to an image processing apparatus, an image processing system, and an image processing method.

2. Description of the Related Art

For example, conventional image forming apparatuses such as an MFP (Multifunction Peripheral/Product) having a plurality of functions, such as printing, copying, scanning, fax transmission, etc., are known. Furthermore, technologies in which the functions of an image forming apparatus are used via wireless communication, from a smart device such as a smartphone, a tablet terminal, etc., are also known.

As a technology related to the above, there is known an image forming system that sends function information of a job from an MFP to a mobile terminal, and displaying only the functions that can be set on a screen of the mobile terminal, thereby simplifying the operation screen and improving the operability (see, for example, Patent Document 1). Furthermore, there is known an electronic device for displaying a common operation screen common to another electronic device, based on operation screen information acquired from another electronic device of a different model, and executing a job based on operations made to this common operation screen (see, for example, Patent Document 2).

Conventionally, in when using a function that depends on the model of the image processing apparatus by using an application running on a smart device, a setting screen, setting information, etc., of the function dependent on the model of the image processing apparatus have been prepared in the application. Therefore, the size of the application has become large, and there has been a need to add new functions and information of a setting screen, etc., to the application, each time a new model is released.

Furthermore, by the method of creating an operation screen common to another electronic device based on operation screen information acquired from another electronic device as in the technology disclosed in Patent Document 2, it has been difficult to set detailed functions dependent on the model of the image processing apparatus.

As described above, when using detailed functions according to the equipment configuration of the image processing apparatus, from an information terminal such as a smart device, there has been a problem in terms of convenience.

Patent Document 1: Japanese Laid-Open Patent Publication No. 2007-074162

Patent Document 2: Japanese Laid-Open Patent Publication No. 2013-157848

SUMMARY OF THE INVENTION

The present invention provides an image processing apparatus, an image processing system, and an image processing method, in which one or more of the above-described disadvantages are eliminated.

According to an aspect of the present invention, an image processing apparatus is provided that includes a receiving unit configured to receive first setting information from an information terminal; a providing unit configured to provide a setting screen for setting second setting information to the information terminal, based on the received first setting information; and an image processing unit configured to execute image processing based on the received first setting information and the second setting information set by the setting screen.

According to an aspect of the present invention, an image processing method is provided that includes receiving first setting information from an information terminal; providing a setting screen for setting second setting information to the information terminal, based on the received first setting information; and executing image processing based on the received first setting information and the second setting information set by the setting screen.

BRIEF DESCRIPTION OF THE DRAWINGS

Other objects, features and advantages of the present invention will become more apparent from the following detailed description when read in conjunction with the accompanying drawings, in which:

FIG. 16 is a sequence chart indicating an example of image processing according to the second embodiment.

DETAILED DESCRIPTION OF THE PREFERRED EMBODIMENTS

Embodiments of the present invention will be described with reference to the accompanying drawings.

<System Configuration>

Figure 1:
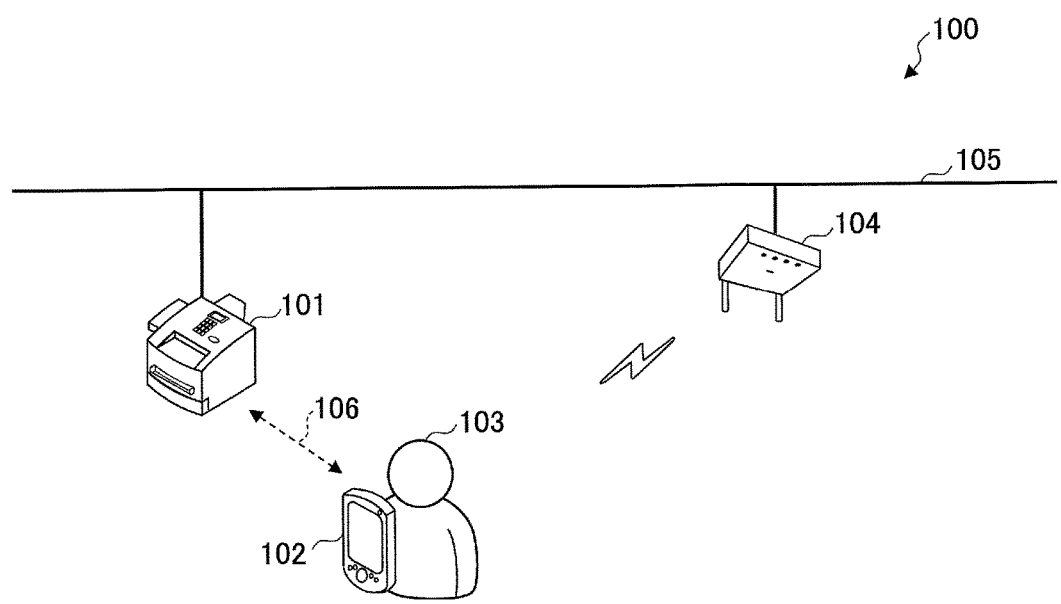
FIG. 1 illustrates an example configuration of an image processing system according to an embodiment.

FIG. 1 illustrates an example configuration of an image processing system according to an embodiment. The image processing system 100 includes, for example, an image forming apparatus 101 and an access point 104, which are connected to a network 105 such as the Internet, a LAN (Local Area Network), etc., and an information terminal 102 held by a user 103.

The image forming apparatus 101 is, for example, an MFP (Multifunction Peripheral/Product), in which a plurality of functions, such as printing, scanning, copying, fax transmission, etc., are accommodated in a single housing. Alternatively, the image forming apparatus 101 may be an image forming apparatus that includes only a single function, such as a printer, a scanner, a copier, a fax machine, etc. Note that the image forming apparatus 101 is an example of an image processing apparatus according to the present embodiment.

The image forming apparatus 101 is connected to the network 105 by, for example, a wired or wireless LAN, etc. Alternatively, for example, the image forming apparatus 101 may have a function of Wi-Fi Direct (registered trademark) or an access point of wireless LAN, such that the image forming apparatus 101 provides the network 105 by itself by wireless LAN, etc.

The image forming apparatus 101 includes an NFC (Near Field Communication) communication function, and by bringing the information terminal 102 close to an NFC reader/writer provided on an operation panel, etc., of the image forming apparatus 101, the image forming apparatus 101 can perform NFC communication with the information terminal 102.

The information terminal 102 is, for example, an information processing apparatus such as a smartphone, a tablet terminal, etc., used by the user 103. Furthermore, the information terminal 102 may be an electronic device such as a mobile phone, a tablet terminal, a game console, a PDA, a digital camera, etc. The information terminal 102 can be connected to the network 105 by, for example, a wireless LAN, etc., via the access point 104. Furthermore, the information terminal 102 may include an NFC communication function, and by bringing the information terminal 102 close to the NFC reader/writer, etc., of the image forming apparatus 101 by a predetermined distance (for example, within 10 cm), the information terminal 102 can perform NFC communication with the image forming apparatus 101. Note that NFC communication is an example of short range radio communication, and the information terminal 102 and the image forming apparatus 101 may perform the short range radio communication based on another short range radio communication standard, etc.

The access point 104 is a connection device for connecting a wireless LAN device such as the information terminal 102 to the network 105. The access point 104 performs authentication on a wireless LAN device requesting to connect to the network 105, and connects the wireless LAN device, for which the authentication has been allowed, to the network 105. The wireless LAN device for which the authentication has been allowed by the access point 104, becomes capable of transmitting and receiving data with a network device such as the image forming apparatus 101 via the network 105.

In the above configuration, the user 103 is able to control the image forming apparatus 101, by using an application program (hereinafter, "application") corresponding to the image forming apparatus 101, operating in the information terminal 102.

For example, the user 103 activates the application at the information terminal 102, sets basic functions of the image forming apparatus 101, and brings the information terminal 102 close to the NFC reader/writer, etc., of the image forming apparatus 101.

Accordingly, the information terminal 102 acquires connection information for connecting to the image forming apparatus 101, from the image forming apparatus 101 by NFC communication, and uses the acquired connection information to connect to the network 105 via the access point 104, etc. Note that this connection information includes, for example, the IP (Internet Protocol) address of the image forming apparatus 101, the SSID (Service Set Identifier) of the access point 104, encryption information, authentication information, etc.

Furthermore, the information terminal 102 sends the setting information (first setting information) set by the user 103, to the image forming apparatus 101. The first setting information includes, for example, information indicating whether to make settings of detailed functions, such as functions dependent on the model of the image forming apparatus 101, the equipment configuration such as the installed options, etc.

When the first setting information includes information indicating whether to make settings of detailed functions, the image forming apparatus 101 creates a setting screen for setting detailed functions based on the received first setting information, and provides the created setting screen to the information terminal 102, for example, by using a function such as remote desktop server, etc.

The information terminal 102 displays the setting screen for setting the detailed functions provided from the image forming apparatus 101, for example, by using a function such as remote desktop client, etc., and prompts the user 103 to set detailed functions.

When the user 103 sets the detailed function, the image forming apparatus 101 executes image processing based on the first setting information received from the information terminal 102 and setting information (second setting information) set by the setting screen for setting the detailed functions.

As described above, in the image processing system 100 according to the present embodiment, the setting screen for setting detailed functions relevant to the model of the image forming apparatus 101, the equipment configuration such as the installed options, etc., is provided by the image forming apparatus 101. Therefore, the application of the information terminal 102 does not need to include information of the detailed functions of the image forming apparatus 101 or a setting screen, etc., and therefore the size of the application can be reduced. Furthermore, even when a new function is added to the image forming apparatus 101, a modification to the application may not be required.

Therefore, by the image forming apparatus 101 according to the present embodiment, it is possible to increase the convenience when using detailed functions such as functions dependent on the model of the image forming apparatus 101, from the information terminal 102 such as a smart device.

Note that the system configuration of FIG. 1 is merely one example. For example, the function of the access point 104 in FIG. 1 may be included in the image forming apparatus 101. Furthermore, the image forming apparatus 101 may have a function of Wi-Fi Direct (registered trademark), etc., and provide the network 105 by itself.

<Hardware Configuration>
(Hardware Configuration of Image Forming Apparatus)

Figure 2:
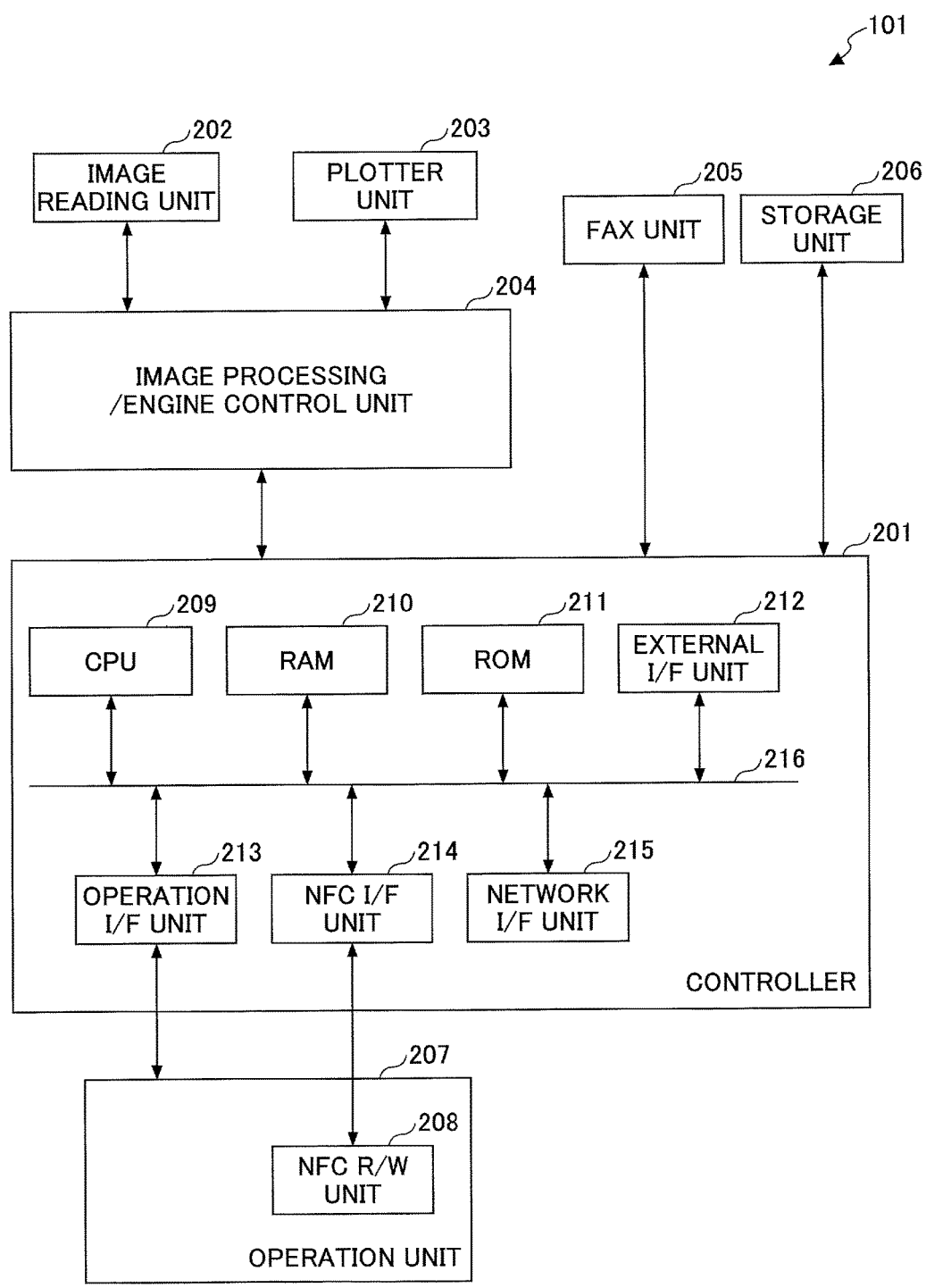
FIG. 2 illustrates an example of a hardware configuration of an image forming apparatus according to an embodiment.

FIG. 2 illustrates an example of a hardware configuration of the image forming apparatus 101 according to an embodiment. The image forming apparatus 101 includes a controller 201, an image reading unit 202, a plotter unit 203, an image processing/engine control unit 204, a fax unit 205, a storage unit 206, an operation unit 207, a NFC R/W (reader/writer) unit 208, etc.

The controller 201 has a configuration of a general-purpose computer, and includes, for example, a CPU (Central Processing Unit) 209, a RAM (Random Access Memory) 210, a ROM (Read-Only Memory) 211, an external I/F (Interface) unit 212, an operation I/F unit 213, an NFC I/F unit 214, a network I/F unit 215, etc., which are connected via a bus 216.

The CPU 209 is an arithmetic device for implementing various functions of the image forming apparatus 101, by loading the programs and data stored in the ROM 211, the storage unit 206, etc., into the RAM 210, and executing processes. The RAM 210 is a volatile memory used as a work area, etc., of the CPU 209. The ROM 211 is a non-volatile memory for holding programs and data even after the power is turned off, and is constituted by, for example, a flash ROM, etc.

The external I/F unit 212 is an interface between the image forming apparatus 101 and an external device. The external device is a recording medium, such as a USB (Universal Serial Bus) memory, a memory card, an optical disk, etc., and various kinds of information terminals, etc. The operation I/F unit 213 is an interface for connecting the operation unit 207 to the controller 201. The NFC I/F unit 214 is an interface for connecting the NFC R/W unit 208 to the controller 201. The NFC R/W unit 208 reads and writes data with respect to an NFC device by NFC communication.

The network I/F unit 215 is, for example, an interface for connecting the image forming apparatus 101 to the network 105, and transmitting and receiving data with a device connected to the network 105. Furthermore, for example, the network I/F unit 215 may have a function of Wi-Fi Direct, etc., or an access point of and wireless LAN, and provide the network 105 by wireless LAN by itself. The bus 216 transmits address signals, data signals, various control signals, etc.

The image reading unit 202 is a scanner engine, etc., for reading images of an original document, etc., according to control by the image processing/engine control unit 204. The plotter unit 203 is a printer engine, etc., for outputting images onto paper, etc., according to control by the image processing/engine control unit 204. The image processing/engine control unit 204 controls the image reading unit 202 and the plotter unit 203, and executes image processing.

The fax unit 205 includes a hardware engine for transmitting and receiving faxes, a control unit for the hardware engine, etc. The storage unit 206 is a storage device such as a HDD (Hard Disk Drive), a SSD (Solid State Drive), etc., and stores various information and data including an OS (Operation System), applications, image data, etc.

The operation unit 207 is a hardware element (operation unit) for receiving input operations from the user, and is also a hardware element (display unit) for displaying information to the user. Note that in the example of FIG. 2, the operation unit 207 includes the NFC R/W unit 208 for reading and writing data with respect to an NFC device by NFC communication. Note that the configuration of FIG. 2 is merely one example; the NFC R/W unit 208 may be provided separately from the operation unit 207.

(Hardware Configuration of Information Terminal)

Figure 3:
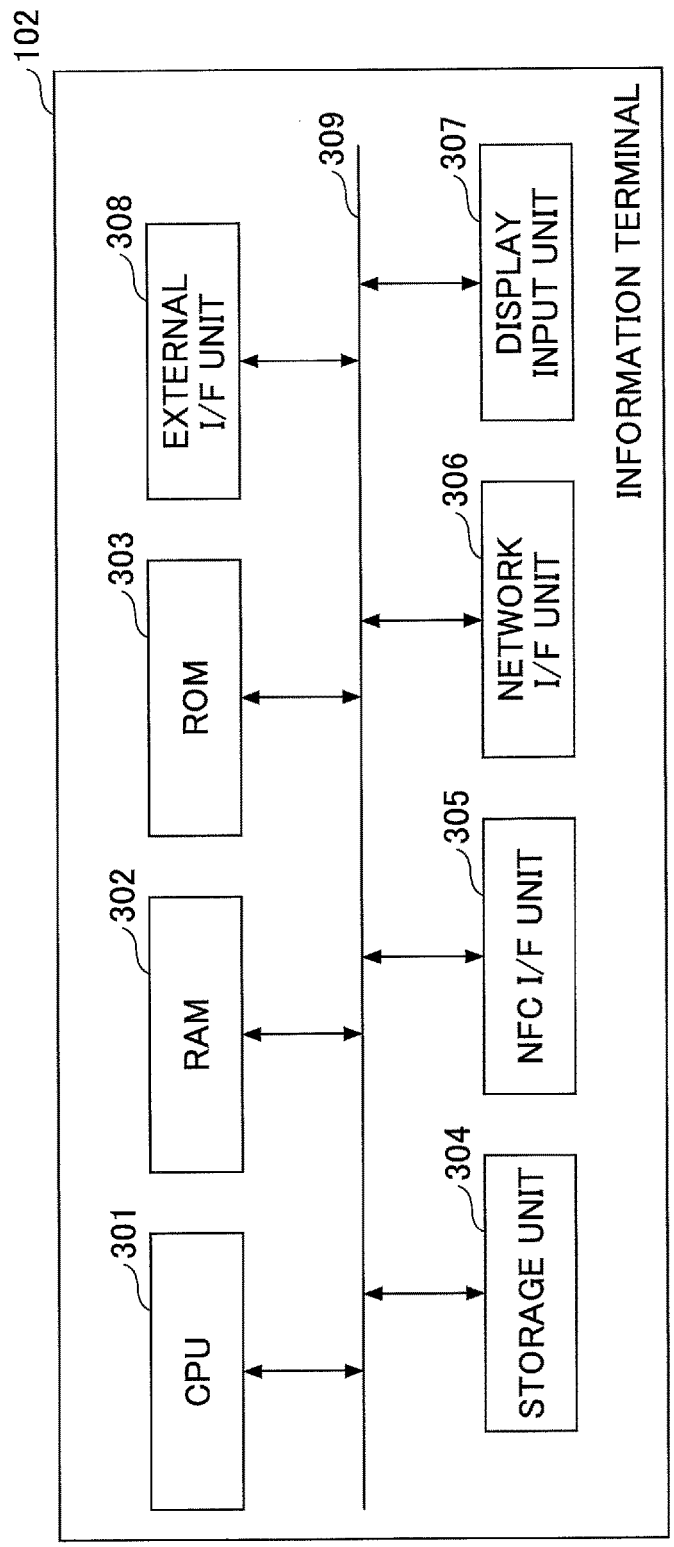
FIG. 3 illustrates an example of a hardware configuration of an information terminal according to an embodiment.

FIG. 3 illustrates an example of a hardware configuration of the information terminal 102 according to an embodiment. The information terminal 102 has a configuration of a general-purpose computer, and includes, for example, a CPU 301, a RAM 302, a ROM 303, a storage unit 304, an NFC I/F unit 305, a network I/F unit 306, a display input unit 307, an external I/F unit 308, a bus 309, etc.

The CPU 301 is an arithmetic device for implementing various functions of the information terminal 102, by loading the programs and data stored in the ROM 303, the storage unit 304, etc., into the RAM 302, and executing processes. The RAM 302 is a volatile memory used as a work area, etc., of the CPU 301. The ROM 303 is a non-volatile memory for holding programs and data even after the power is turned off, and is constituted by, for example, a flash ROM, etc. The storage unit 304 is a storage device such as a HDD, SSD, etc., and stores, for example, an OS, an application program, various kinds of data, etc.

The NFC I/F unit 305 is a communication interface for performing short range radio communication by NFC communication. The network I/F unit 306 is, for example, a communication interface such as wireless LAN, etc., for connecting the information terminal 102 to the network 105, and transmitting and receiving data with the image forming apparatus 101.

The display input unit 307 is, for example, a touch panel display, etc., in which a touch panel and a display are integrated in a single body. The display input unit 307 includes an input unit for operating the information terminal 102 and a display unit for displaying processing results, etc., obtained by the information terminal 102. Note that in the display input unit 307, the display unit and the input unit may be separately provided. The external I/F unit 308 is an interface between the information terminal 102 and an external device. The external device is, for example, a recording medium such as a USB memory, a memory card, an optical disk, etc., and an electronic device such as the image forming apparatus 101, etc. The bus 309 transmits address signals, data signals, various control signals, etc.

First Embodiment

<Functional Configuration>

Figure 4:
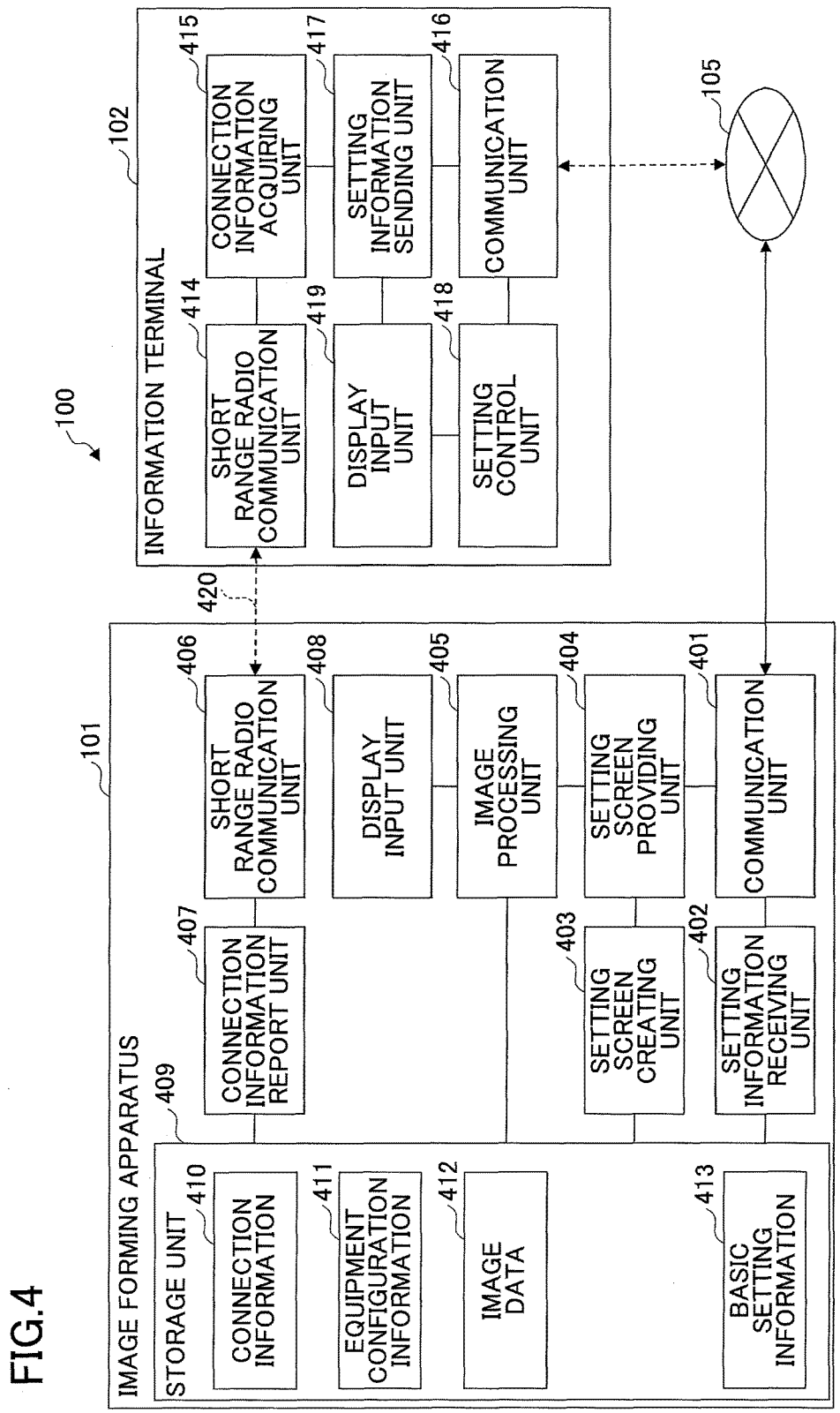
FIG. 4 illustrates an example of a functional configuration of the image processing system according to an embodiment.

FIG. 4 illustrates an example of a functional configuration of the image processing system 100 according to an embodiment. In FIG. 4, the image processing system 100 includes the image forming apparatus 101 and the information terminal 102. The image forming apparatus 101 and the information terminal 102 can transmit and receive data with each other by, for example, by short range radio communication 420 for performing NFC communication, etc. Furthermore, the image forming apparatus 101 is connected to the network 105 by, for example, wired/wireless LAN, etc. Furthermore, the information terminal 102 may be connected to the network 105 by, for example, wireless LAN communication, etc.

Note that the connection to the network 105 by the information terminal 102 does not necessarily need to be performed through the access point 104 of FIG. 1, and therefore the access point 104 may be omitted from the functional configuration example of FIG. 4.

(Functional Configuration of Image Forming Apparatus)

The image forming apparatus 101 includes a communication unit 401, a setting information receiving unit 402, a setting screen creating unit 403, a setting screen providing unit 404, an image processing unit 405, a short range radio communication unit 406, a connection information report unit 407, a display input unit 408, a storage unit 409, etc.

The communication unit 401 is a unit for connecting the image forming apparatus 101 to the network 105, and realizing data communication with another network device; for example, the communication unit 401 is realized by the network I/F unit 215 and programs, etc. operating in the CPU 209 of FIG. 2.

The setting information receiving unit (receiving unit) 402 is a unit for receiving setting information (first setting information) from the information terminal 102 via the communication unit 401; for example, the setting information receiving unit 402 is realized by programs, etc. operating in the CPU 209 of FIG. 2. The first setting information that is received by the setting information receiving unit (receiving unit) 402 from the information terminal 102 includes basic setting information common to other image forming apparatuses, for example, information relevant to the function to be used (copying, printing, etc.), information indicating the number of copies, information indicating the color (monochrome, color, etc.).

Furthermore, the first setting information that is received by the setting information receiving unit (receiving unit) 402 from the information terminal 102 includes, for example, information indicating whether to make a setting of detailed setting information according to the model of the image forming apparatus 101, the option functions included in the image forming apparatus 101, etc. Preferably, the first setting information that is received by the setting information receiving unit (receiving unit) 402 from the information terminal 102 includes information of a display input unit 419 of the information terminal 102 (for example, the size, the resolution, etc., of the display screen of the display input unit 307).

Note that the setting information receiving unit 402 may receive setting information other than the first setting information.

The setting screen creating unit 403 creates a setting screen for setting detailed setting information (second setting information) of the image forming apparatus 101, based on the setting information (first setting information) received from the information terminal 102 and equipment configuration information 411 stored in the storage unit 409, etc. Note that the setting screen creating unit 403 is realized by, for example, programs, etc. operating in the CPU 209 of FIG. 2. The setting screen creating unit 403 preferably creates a setting screen for setting detailed setting information, when the setting information received by the setting information receiving unit 402 from the information terminal 102 includes information indicating to make a setting of detailed setting information.

Preferably, the setting screen creating unit 403 creates a setting screen for setting detailed setting information, according to the information of the display input unit 419 of the information terminal 102 included in the setting information received by the setting information receiving unit 402 from the information terminal 102.

The setting screen providing unit 404 is a unit for providing the setting screen for setting detailed setting information created by the setting screen creating unit 403 to the information terminal 102. The setting screen providing unit 404 is realized by, for example, programs, etc. operating in the CPU 209 of FIG. 2.

For example, the setting screen providing unit 404 is realized by a remote desktop server, etc., operating in the CPU 209 of FIG. 2. In this case, the setting screen providing unit 404 provides (transfers) the setting screen created by the setting screen creating unit 403 to the remote desktop client of the information terminal 102, by using a remote desktop function.

The image processing unit 405 executes image processing, for example, printing, scanning, fax transmission, etc., based on the first setting information received by the setting information receiving unit 402 and the second setting information set in the setting screen provided by the setting screen providing unit 404. The image processing unit 405 is realized by, for example, the image processing/engine control unit 204, the image reading unit 202, the plotter unit 203, the fax unit 205, and programs, etc. operating in the CPU 209 of FIG. 2.

The short range radio communication unit 406 is a unit for performing communication with the information terminal 102 by short range radio communication such as NFC communication, etc., and is realized by, for example, the NFC R/W unit 208, the NFC I/F unit 214, and programs, etc. operating in the CPU 209 of FIG. 2.

The connection information report unit 407 is a unit for reporting connection information of the image forming apparatus 101 to the information terminal 102 via the short range radio communication unit 406, and is realized by, for example, programs, etc. operating in the CPU 209 of FIG. 2.

Next, connection information 410 will be described.

TABLE 1

| SSID |
| Network encryption method |
| Network password |
| IP address of image forming apparatus |

Table 1 shows an example of the connection information 410.

As indicated in table 1, the connection information 410 includes, for example, an SSID, a network encryption method, a network password, an IP address of image forming apparatus, etc.

The SSID is an identifier of a wireless LAN network used for connecting to the network 105 via the access point of wireless LAN. The network encryption method and the network password are information such as a code key, password information, certificate information, etc., which is used for connecting to the wireless LAN network.

The IP address of the image forming apparatus is the address information for sending data to the image forming apparatus 101 via the network 105, such as the IP address, the MAC address, etc., of the image forming apparatus 101.

The display input unit 408 is a unit for displaying the operation screen, the setting screen, etc., of the image forming apparatus 101, and for receiving operations of the user, and is realized by, for example, the operation unit 207, and programs, etc. operating in the CPU 209 of FIG. 2.

The storage unit 409 is a unit for storing various kinds of information, such as connection information 410, equipment configuration information 411, image data 412, basic setting information 413, etc., and is realized by, for example, the storage unit 206, the ROM 211, of FIG. 2.

The image data 412 includes image data generated by image processing performed by the image processing unit 405, image data that is the processing target of the image processing unit 405, etc.

The basic setting information 413 is the basic setting information (first setting information) that is received by the setting information receiving unit 402 from the information terminal 102 and stored in the storage unit 409.

The equipment configuration information 411 is information relevant to the equipment configuration of the image forming apparatus 101, such as the model, the installed options, etc., of the image forming apparatus 101.

Next, the equipment configuration information 411 will be described.

TABLE 2

Stapling
Sorting
HDD
Duplex unit
Printing mechanism

Table 2 shows an example of the equipment configuration information 411.

As shown in table 2, the equipment configuration information 411 includes information indicating the equipment configuration included in the image forming apparatus 101, such as stapling, sorting, HDD, duplex unit, printing mechanism, etc.

In table 2, stapling is information relevant to the stapling function of the image forming apparatus 101 (for example, information indicating whether there is a stapling function). Sorting is information relevant to the sorting function of the image forming apparatus 101 (for example, whether there is a sorter, the type of sorting, etc.). HDD is information relevant to the HDD of the image forming apparatus 101 (for example, whether there is a HDD, the capacity, the free space, etc.). Duplex unit is information relevant to the duplex unit function of the image forming apparatus 101 (for example, whether there is a duplex unit, the type, etc.). Printing mechanism is information relevant to the printing function of the image forming apparatus 101.

By the configuration of FIG. 4, the image forming apparatus 101 reports the connection information of the image forming apparatus 101 to the information terminal 102 that has come close to the short range radio communication unit 406.

Furthermore, the image forming apparatus 101 provides, to the information terminal 102, a setting screen for setting detailed setting information, based on received basic setting information, when the basic setting information (first setting information) is received from the information terminal 102 via the network 105.

Furthermore, the image forming apparatus 101 executes image processing based on the basic setting information (first setting information) received from the information terminal 102 and detailed setting information (second setting information) set by the setting screen for setting the detailed setting information.

(Functional Configuration of Information Terminal)

The information terminal 102 includes a short range radio communication unit 414, a connection information acquiring unit 415, a communication unit 416, a setting information sending unit 417, a setting control unit 418, and a display input unit 419.

The short range radio communication unit 414 is a unit that communicates with the image forming apparatus 101 by short range radio communication of the same communication method (NFC communication, etc.) as the image forming apparatus 101, and is realized by, for example, the NFC I/F unit 305 and programs, etc. operating in the CPU 301 of FIG. 3.

The connection information acquiring unit 415 is a unit that acquires connection information of the image forming apparatus 101 from the image forming apparatus 101 by using the short range radio communication unit 414, and is realized by, for example, programs, etc. operating in the CPU 301 of FIG. 3. For example, the connection information acquiring unit 415 acquires connection information reported from the image forming apparatus 101 by NFC communication when the information terminal 102 is brought close to the image forming apparatus 101.

The communication unit 416 is a unit that connects the information terminal 102 to the network 105 and transmits and receives data with the image forming apparatus 101, etc., and is realized by, for example, the network I/F unit 306 and programs, etc. operating in the CPU 301 of FIG. 3. For example, the communication unit 416 uses the connection information acquired by the connection information acquiring unit 415 to connect the information terminal 102 to the network 105, and enables data communication with the image forming apparatus 101, etc.

The setting information sending unit 417 is a unit that sends setting information (first setting information) of the basic function set by the user 103 to the image forming apparatus 101 via the communication unit 416, and is realized by, for example, programs, etc. operating in the CPU 301 of FIG. 3. For example, the setting information sending unit 417 causes the display input unit 419 to display a function selection screen, a selection screen of basic functions, etc., described below, and sends the information set by the user 103 to the image forming apparatus 101 as basic setting information.

Preferably, the setting information sending unit 417 sends information of the display input unit 419, such as the screen size, the resolution, etc., to the image forming apparatus 101, by including this information in the basic setting information. Accordingly, the image forming apparatus 101 can create a setting screen for detailed functions according to the size, the resolution, etc., of the display input unit 419 of the information terminal 102.

The setting control unit 418 causes the display input unit 419 to display a setting screen for setting detailed setting information, which is provided from the setting screen providing unit 404 of the image forming apparatus 101, and prompts the user 103 to set (input) detailed setting information. The setting control unit 418 is realized by, for example, programs, etc. operating in the CPU 301 of FIG. 3.

For example, the setting control unit 418 is realized by a remote desktop client operating in the CPU 301 of FIG. 3. In this case, the setting control unit 418 causes the display input unit 419 to display the setting screen provided from the remote desktop server (setting screen providing unit 404) of the image forming apparatus 101, and sends the operation information, which is input to the display input unit 419, to the remote desktop server.

The display input unit 419 is a unit that displays an operation screen of the information terminal 102, a setting screen provided from the image forming apparatus 101, etc., and for receiving input operations of the user, and is realized by, for example, the display input unit 307 and programs, etc. operating in the CPU 301 of FIG. 3.

With the above configuration, the user 103 inputs basic setting information in the display input unit 419 of the information terminal 102, and then brings the information terminal 102 close to the image forming apparatus 101. Accordingly, the information terminal 102 acquires connection information from the image forming apparatus 101, and uses the acquired connection information to send the basic setting information to the image forming apparatus 101. Subsequently, the information terminal 102 causes the display input unit 419 to display the setting screen for the detailed setting information provided from the image forming apparatus 101. The information terminal 102 uses the detailed setting information input to the setting screen for the detailed setting information by the user 103, to request the image forming apparatus 101 to execute image processing.

<Process Flow>
(Flow of User Operation)

Figure 5:
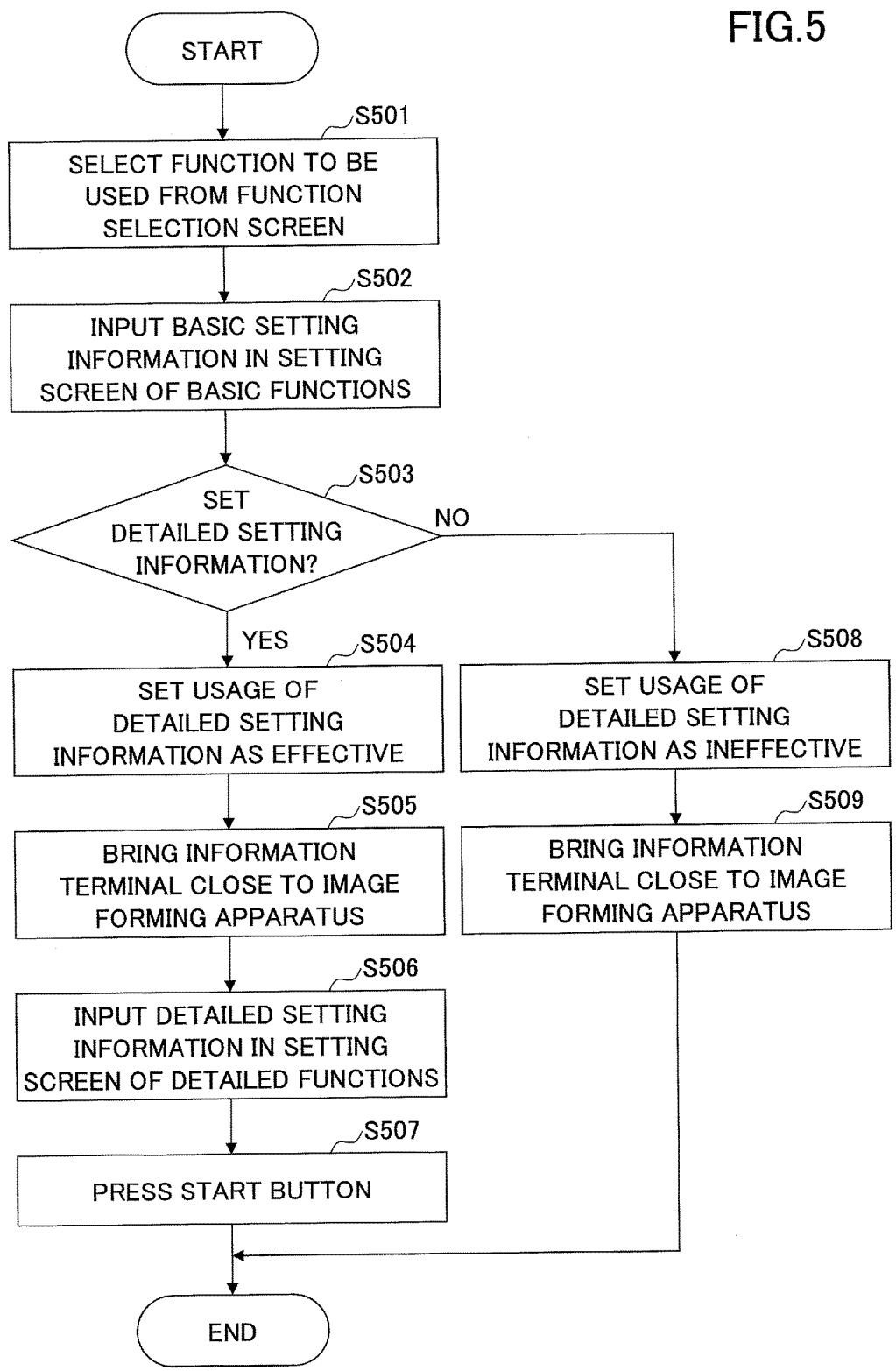
FIG. 5 is a flowchart of user operations with respect to the information terminal according to a first embodiment.

FIG. 5 is a flowchart of user operations with respect to the information terminal 102 according to the first embodiment. Note that, it is assumed that, before the process of FIG. 5, an application corresponding to the image forming apparatus 101, which is installed in the information terminal 102, has been activated, and a function selection screen for selecting a function for performing a process is displayed on the display input unit 419 of the information terminal 102.

In step S501, the user 103 selects a function to be used, from the function selection screen displayed on the display input unit 419.

Figure 6:
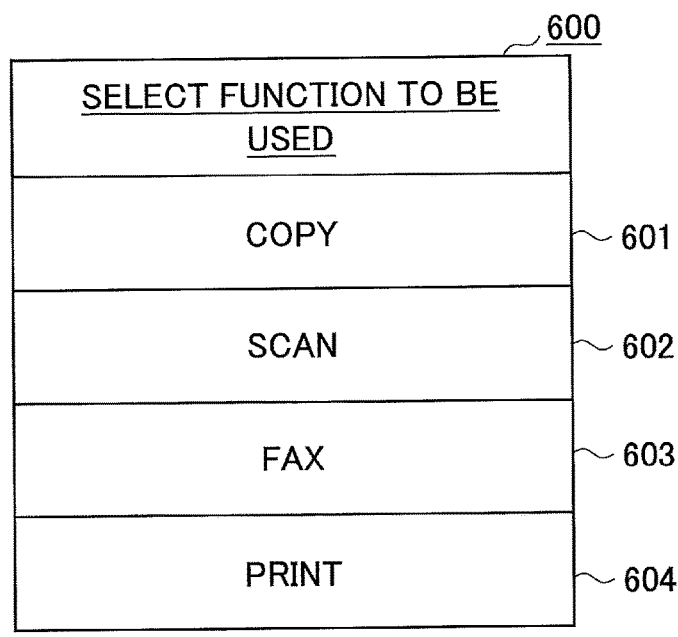
FIG. 6 illustrates an example of a function selection screen according to the first embodiment.

FIG. 6 illustrates an example of a function selection screen according to the first embodiment. A function selection screen 600 displays, in a selectable manner, functions such as copy 601, scan 602, fax 603, print 604, etc., which correspond to functions available in the image forming apparatus 101. For example, when the user presses (touches) the area of copy 601 in the function selection screen 600, a setting screen for basic functions relevant to the copy function is displayed.

Figure 7:
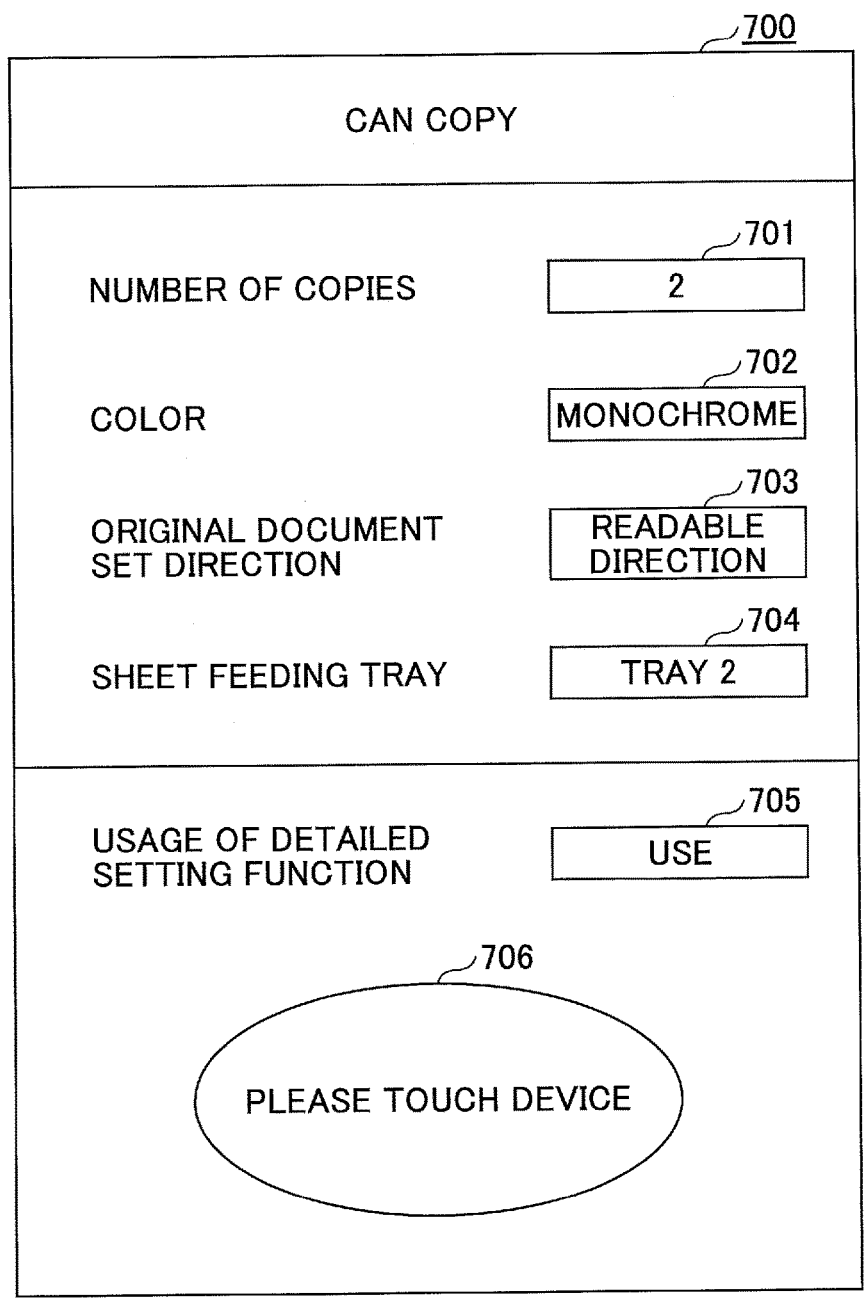
FIG. 7 illustrates an example of a setting screen for basic functions according to the first embodiment.

FIG. 7 illustrates an example of a setting screen for basic functions according to the first embodiment. In the example of FIG. 7, a setting screen for basic functions 700 includes a field for setting the number of copies 701, a field for setting the color 702, a field for setting the original document set direction 703, a field for setting the sheet feeding tray 704, a field for setting the usage of detailed setting functions 705, a message field 706, etc.

The field for setting the number of copies 701 is a setting field for the user 103 to input the number of copies. The field for setting the color 702 is a setting field for the user 103 to select, for example, whether to perform color copying or monochrome copying. The field for setting the original document set direction 703 is a setting field for the user 103 to select the direction of setting the original document, such as a direction in which the document can be read or a direction in which the document is not read, etc. The field for setting the sheet feeding tray 704 is a setting field for the user 103 to select the sheet feeding tray.

Note that the above setting fields are examples of setting fields that are displayed in the setting screen for basic functions 700. The setting screen for basic functions 700 may not necessarily include all of the above setting fields, and may include other setting fields. That is, the setting screen for basic functions 700 includes setting items common to other image forming apparatuses, which are setting items having a low degree of dependency on the model, the installed options, etc., of the image forming apparatus 101.

Furthermore, the setting screen for basic functions 700 includes a field for setting the usage of detailed setting functions 705, which is for the user 103 to select whether to use a detailed setting function dependent on the model, the installed options, etc., of the image forming apparatus 101. If the user 103 wants to perform the process according to the setting contents of the setting screen for basic functions 700, without making detailed settings, the user 103 selects "do not use" in the field for setting the usage of detailed setting functions 705. On the other hand, if the user 103 wants to make detailed settings, the user 103 selects "use" in the field for setting the usage of detailed setting functions 705.

In the message field 706, a message to the user is displayed. In the present embodiment, image processing starts as the user 103 brings the information terminal 102 close to the image forming apparatus 101, and therefore in the message field 706, a message for prompting the user to bring the information terminal 102 close to the image forming apparatus 101 is displayed.

Referring back to FIG. 5, the description of the flowchart is continued.

In step S502, the user 103 sets (inputs) basic setting information in, for example, the setting screen for basic functions 700 of FIG. 7, such as the number of copies, the color, the original document set direction, the sheet feeding tray, etc.

In step S503, when detailed setting information is to be set, the user 103 sets the usage of detailed setting information as being effective (step S504). For example, the user 103 sets "use" in the field for setting the usage of detailed setting functions 705 in the setting screen for basic functions 700 of FIG. 7.

In step S505, when the user 103 finishes making settings in the setting screen for basic functions 700, the user 103 brings (holds over) the information terminal 102 close to the short range radio communication unit 406 (the NFC R/W unit 208 of FIG. 2, etc.) of the image forming apparatus 101. Accordingly, on the information terminal 102, a setting screen for detailed functions provided by the image forming apparatus 101 is displayed.

Figure 8:
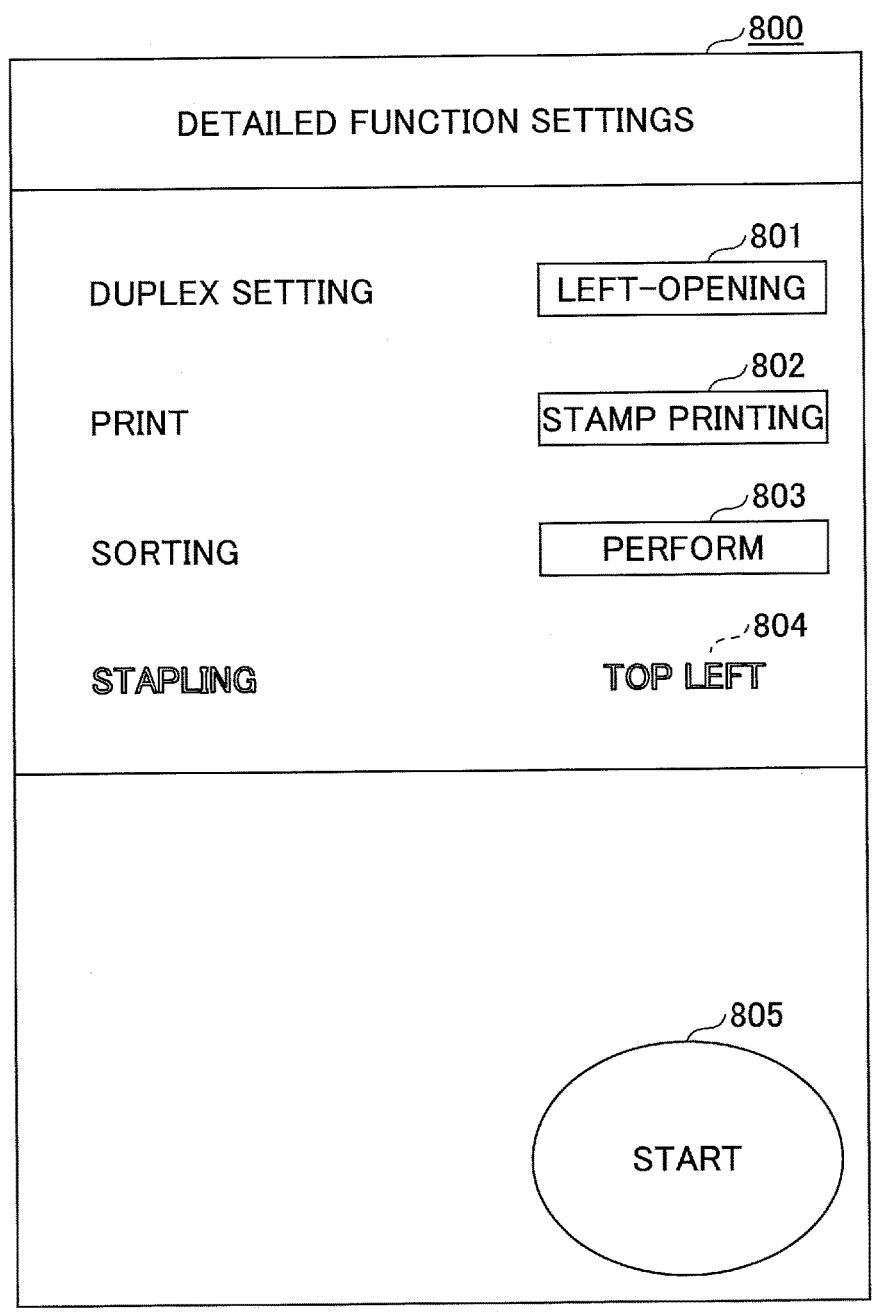
FIG. 8 illustrates an example of a setting screen for detailed functions according to the first embodiment.

FIG. 8 illustrates an example of a setting screen for detailed functions according to the first embodiment. In the example of FIG. 8, in a setting screen for detailed functions 800, a field for setting a duplex setting 801, a field for setting print 802, a field for setting sorting 803, etc., are displayed. Furthermore, an item for which a detailed setting cannot be made due to the setting of the basic functions, for example, a field for setting stapling 804 is displayed in a grayed out manner such that a setting cannot be made. Furthermore, in the setting screen for detailed functions 800, a start button 800 for instructing to start the process is displayed.

Note that an item for which a detailed setting cannot be made due to the setting of the basic functions includes, for example, a case where the stapling function cannot be used with respect to sheet feeding trays for sheet sizes of A5 or less in the image forming apparatus 101, a case where left cannot be selected for the position of stapling due to the original document set direction in the image forming apparatus 101, etc. The information of functions that cannot be simultaneously used by the image forming apparatus 101 is preferably stored in, for example, the storage unit 409, etc.

The field for setting a duplex setting 801 is a setting field for the user 103 to select, for example, left-opening, right-opening, top-opening, etc., as the duplex setting.

The field for setting print 802 is, for example, a setting field for the user 103 to select whether to perform stamp printing, etc.

The field for setting sorting 803 is, for example, a setting field for the user 103 to select whether to perform sorting.

The field for setting stapling 804 is, for example, a setting field for the user 103 to select the position of the stapling, whether to apply stapling, etc.

Note that the above setting fields are examples of setting fields that are displayed in the setting screen for detailed functions 800. The setting screen for detailed functions 800 may not necessarily include all of the above setting fields, and may include other setting fields. That is, setting screen for detailed functions 800 includes detailed setting items dependent on the model, the installed options, etc., of the image forming apparatus 101.

Furthermore, the user 103 can instruct the image forming apparatus 101 to start image processing (for example, copying), by pressing (touching) a start button 805.

Figure 9:
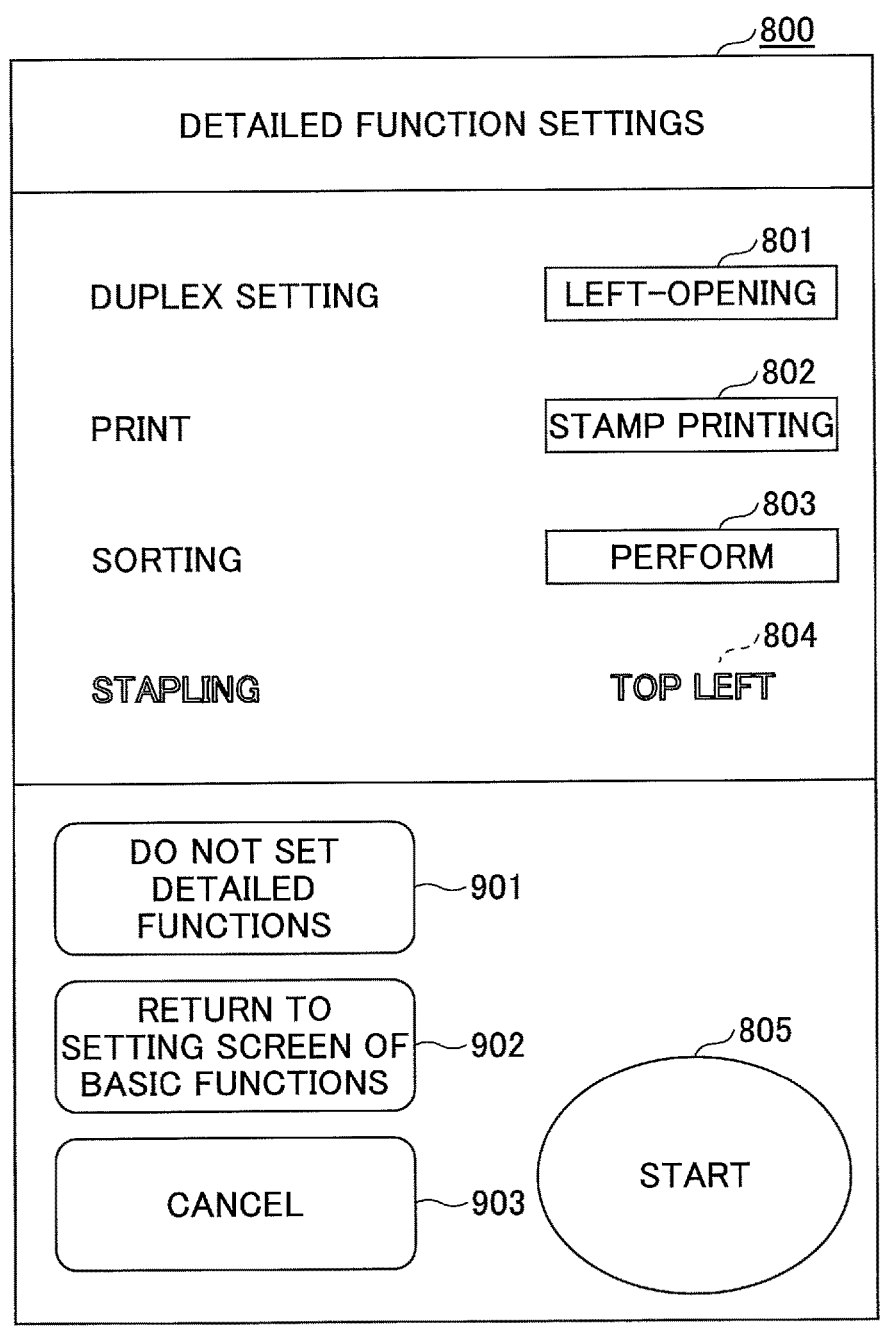
FIG. 9 illustrates another example of a setting screen for detailed functions according to the first embodiment.

FIG. 9 illustrates another example of a setting screen for detailed functions according to the first embodiment. The setting screen for detailed functions 800 includes a setting button for not setting detailed functions 901, a setting button for returning to the setting screen for basic functions 902, a setting button for canceling the process 903, etc., in addition to the display contents illustrated in FIG. 8.

For example, if the user 103 wants to start image processing without setting detailed functions, the user 103 can start image processing according to settings of the basic functions, by pressing the setting button for not setting detailed functions 901 and the start button 805.

Furthermore, for example, if the user 103 wants to review the settings of basic functions, the user 103 can return to the setting screen for basic functions 700 by pressing the setting button for returning to the setting screen for basic functions 902.

Furthermore, if the user 103 wants to cancel the image processing, the user can cancel the process by pressing the setting button for canceling the process 903.

Note that the above setting screen for detailed functions 800 is one example. For example, the setting screen for detailed functions 800 may have a feature that the process is automatically cancelled unless the start button 805 is pressed within a predetermined time (for example, within 10 minutes), in the setting screen of FIG. 8. Alternatively, the information terminal 102 may return to the setting screen for basic functions 700 upon detecting a predetermined operation made to the information terminal 102 (for example, shaking or tilting the information terminal 102, etc.).

Referring back to FIG. 5, the description of the flowchart is continued.

In step S506, the user 103 inputs detailed setting information in the setting screen for detailed functions 800.

When the user 103 finishes making settings in the setting screen for detailed functions 800, in step S507, the user 103 presses the start button 805. By this operation, the user 103 instructs the image forming apparatus 101 to start image processing.

On the other hand, in step S503, if detailed setting information is not to be set, in step S508, the user 103 sets the usage of detailed setting information as being ineffective. For example, the user 103 sets "do not use" in the field for setting the usage of detailed setting functions 705 in the setting screen for basic functions 700 of FIG. 7.

Subsequently, the user 103 brings the information terminal 102 close to the short range radio communication unit 406 of the image forming apparatus 101. By this operation, the user 103 instructs the image forming apparatus 101 to start image processing.

Figure 10:
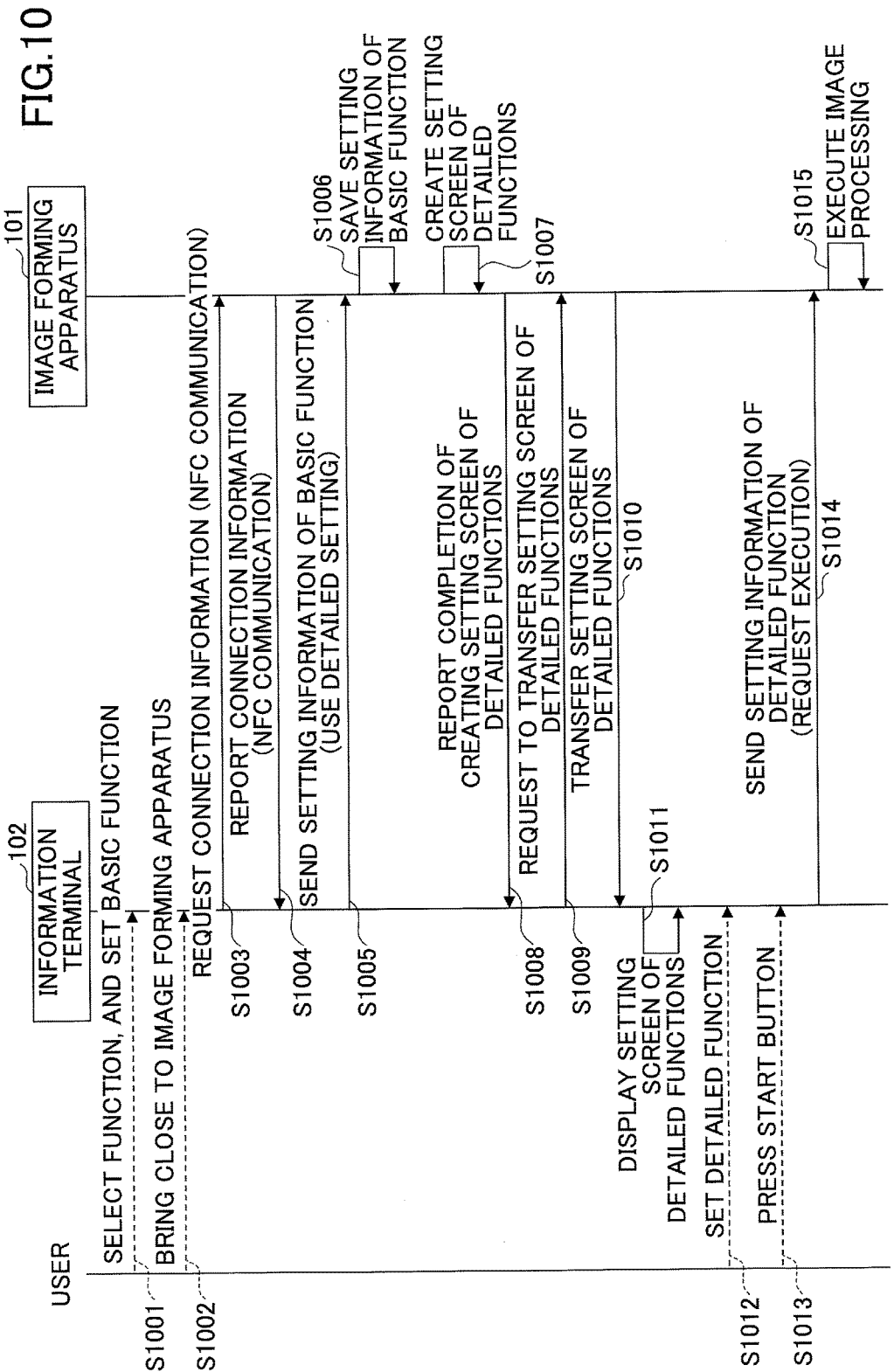
FIG. 10 is a sequence chart indicating an example of image processing according to the first embodiment.

FIG. 10 is a sequence chart indicating an example of image processing according to the first embodiment. This sequence chart indicates the flow of a process performed between the information terminal 102 and the image forming apparatus 101, mainly according to the operations by the user 103 described with reference to FIG. 5. Note that in FIG. 10, the dashed arrows indicate operations made to the information terminal 102 by the user 103.

In step S1001, the user 103 selects a function to be used from the function selection screen 600, and sets the basic functions in the setting screen for basic functions 700, etc.

Note that in the example of FIG. 10, it is assumed that "use" is set in the field for setting the usage of detailed setting functions 705 in the setting screen for basic functions 700.

In step S1002, the user 103 brings the information terminal 102 close to the short range radio communication unit 406 of the image forming apparatus 101. Accordingly, short range radio communication, such as NFC communication, is established between the information terminal 102 and the image forming apparatus 101, and transmission and reception of data can be performed by NFC communication.

In step S1003, the connection information acquiring unit 415 of the information terminal 102 requests the image forming apparatus 101 to provide connection information, by NFC communication via the short range radio communication unit 414.

In step S1004, the connection information report unit 407 of the image forming apparatus 101 reports the connection information 410 stored in the storage unit 409, to the information terminal 102 by NFC communication via the short range radio communication unit 406, in response to the request for the connection information from the information terminal 102.

In step S1005, the setting information sending unit 417 of the information terminal 102 sends the setting information of basic functions (first setting information) set in step S1001 to the image forming apparatus 101, by using the connection information reported from the image forming apparatus 101. This first image forming apparatus 101 includes, for example, information of the function (for example, copy) that the user 103 wants to use, setting information of the number of copies, setting information of color, information indicating to use detailed setting functions, etc.

In step S1006, the setting information receiving unit 402 of the image forming apparatus 101 receives the setting information of basic functions from the information terminal 102, and stores the received information in the storage unit 409 in association with the identification information of the information terminal 102, for example, as the basic setting information 413.

Note that the identification information of the information terminal 102 is information for identifying the information terminal 102 included in a reception frame received from the information terminal 102. As the identification information of the information terminal 102, for example, it is possible to use information such as a transmission source IP address, a transmission source MAC address, etc., that is automatically added to a LAN frame, etc., sent by the information terminal 102. Alternatively, it is possible to use identification information having a predetermined format as the identification information of the information terminal 102, which is sent by being attached to the setting information of basic functions, from the information terminal 102.

In step S1007, the setting screen creating unit 403 of the image forming apparatus 101 creates the setting screen for detailed functions 800, based on the setting information of basic functions received by the setting information receiving unit 402 or the basic setting information 413 stored in the storage unit 409.

In step S1008, the image forming apparatus 101 reports to the information terminal 102 that the creation of the setting screen for detailed functions 800 has been completed.

In step S1009, the information terminal 102 requests the image forming apparatus 101 to transfer the setting screen for detailed functions 800 that has been created. For example, the information terminal 102 requests a connection to the setting screen providing unit 404 (remote desktop server, etc.), by the setting control unit 418 (remote desktop client, etc.).

In step S1010, the image forming apparatus 101 transfers the setting screen for detailed functions 800 to the information terminal 102. For example, the setting screen providing unit 404 of the image forming apparatus 101 transfers the setting screen for detailed functions 800 to the setting control unit 418 of the information terminal 102, by a remote desktop function.

In step S1011, the setting control unit 418 of the information terminal 102 causes the display input unit 419 to display the setting screen for detailed functions 800 transferred from the image forming apparatus 101.

In step S1012, the user 103 sets the detailed functions by the setting screen for detailed functions 800 displayed on the display input unit 419.

In step S1013, the user 103 presses the start button 805 in the setting screen for detailed functions 800, after finishing setting the detailed functions.

In step S1014, the information terminal 102 sends, for example, by a remote desktop function to the image forming apparatus 101, setting information set by the setting screen for detailed functions 800, and information such as a request to execute image processing made by pressing the start button 805.

In step S1015, the image forming apparatus 101, which has received the setting information of detailed functions from the information terminal 102, reads the basic setting information 413, which is stored in the storage unit 409 in association with the identification of the information terminal 102 included in the reception frame. Furthermore, the image processing unit 405 executes image processing based on the basic setting information 413 (first setting information) that has been read, and the detailed setting information set in the setting screen for detailed functions 800 (second setting information).

Second Embodiment

In the first embodiment, for example, the image forming apparatus 101 creates a setting screen for detailed functions in step S1007 of FIG. 10, and provides the created detailed setting screen to the information terminal 102 in step S1008. In this method, for example, there may be a case where all of the setting items cannot be displayed in the setting screen for detailed functions, for example, when there are many detailed functions, when there is included a function having many setting items, when the display screen of the information terminal 102 is small, etc.

Therefore, in the present embodiment, an example where a list of functions included in the image forming apparatus 101 is displayed on the information terminal 102, the user 103 selects a function from the list, and the image forming apparatus 101 provides a setting screen for detailed functions relevant to the function selected by the user 103, will be described.

<Functional Configuration>

Figure 11:
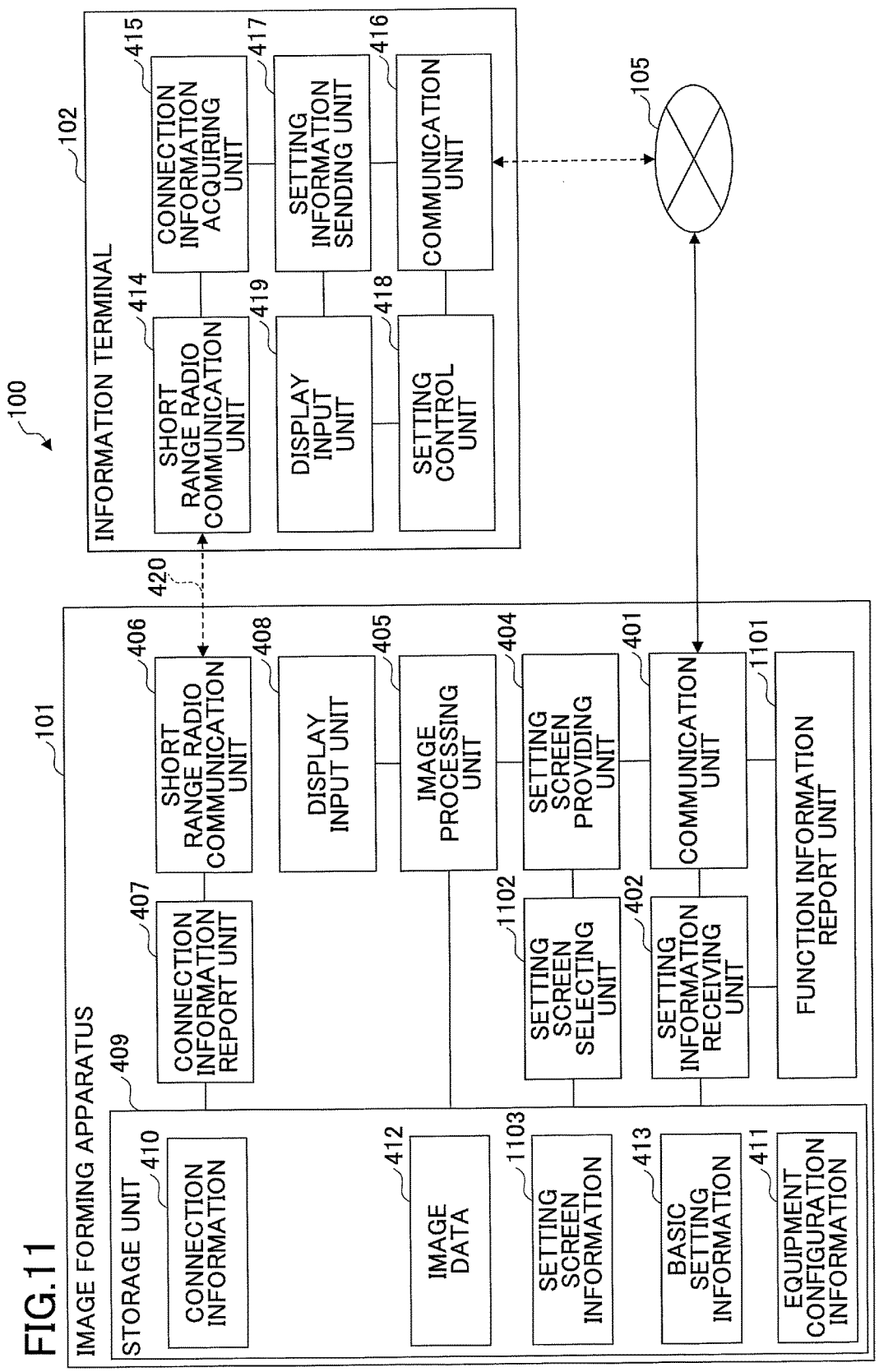
FIG. 11 illustrates an example of a functional configuration of the image processing system according to a second embodiment.

FIG. 11 illustrates an example of a functional configuration of the image processing system 100 according to the second embodiment. The image forming apparatus 101 according to the present embodiment includes a function information report unit 1101, in addition to the functional configuration according to the first embodiment illustrated in FIG. 4. Furthermore, the image forming apparatus 101 according to the present embodiment includes a setting screen selecting unit 1102, instead of the setting screen creating unit 403 according to the first embodiment illustrated in FIG. 4. Furthermore, the storage unit 409 stores setting screen information 1103. Note that the other configurations are the same as the functional configuration according to the first embodiment illustrated in FIG. 4, and therefore the differences are mainly described below.

The function information report unit 1101 is a unit that reports information relevant to a function of the image forming apparatus 101, to the information terminal 102, and is realized by, for example, programs, etc. operating in the CPU 209 of FIG. 2. The function information report unit 1101 reports information of a list of functions according to the equipment configuration of the image forming apparatus 101 to the information terminal 102, based on the equipment configuration information 411, etc., in the storage unit 409, when the first setting information received by the storage unit 409 includes information requesting the list of functions.

The setting screen selecting unit 1102 selects a detailed setting screen from the setting screen information 1103 stored in the storage unit 409. The selected detailed setting screen is relevant to a function selected by the user 103 of the information terminal 102, from the list of functions reported to the information terminal 102 by the function information report unit 1101. The setting screen selecting unit 1102 is realized by, for example, programs, etc. operating in the CPU 209 of FIG. 2.

The setting screen information 1103 includes a setting screen for detailed functions, for each of the functions available in the image forming apparatus 101. As the setting screen for detailed functions available in the setting screen information 1103, for example, it is possible to use as setting screen, etc., displayed on the display input unit 408, etc., of the image forming apparatus 101.

Note that also in the present embodiment, the setting screen creating unit 403 of FIG. 4 may be included instead of the setting screen selecting unit 1102 of FIG. 11, and the setting screen creating unit 403 may create a setting screen for detailed functions.

<Process Flow>

Figure 12:
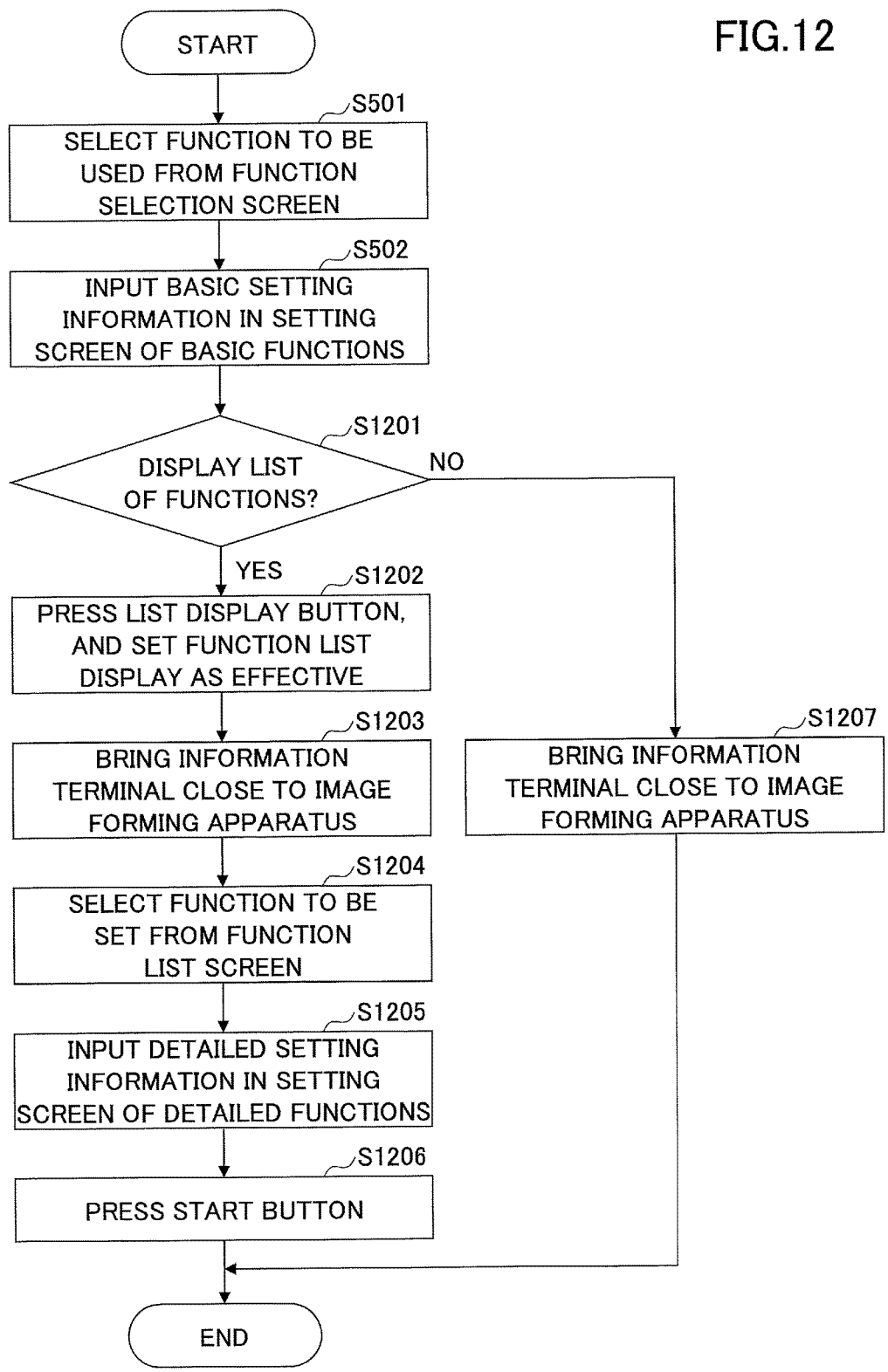
FIG. 12 is a flowchart of user operations with respect to the information terminal according to the second embodiment.

FIG. 12 is a flowchart of user operations with respect to the information terminal 102 according to the second embodiment. Note that the processes of steps S501 and S502 of FIG. 12 are the same as those of the first embodiment, and therefore the differences are mainly described below.

The process branches according to whether the user 103 selects to display a list of functions in the setting screen for basic functions in step S1201.

In step S1201, when the user 103 wants to display a list of functions of the image forming apparatus 101, the process shifts to step S1202, and the user 103 sets the function list in the setting screen for basic functions as being effective.

Figure 13:
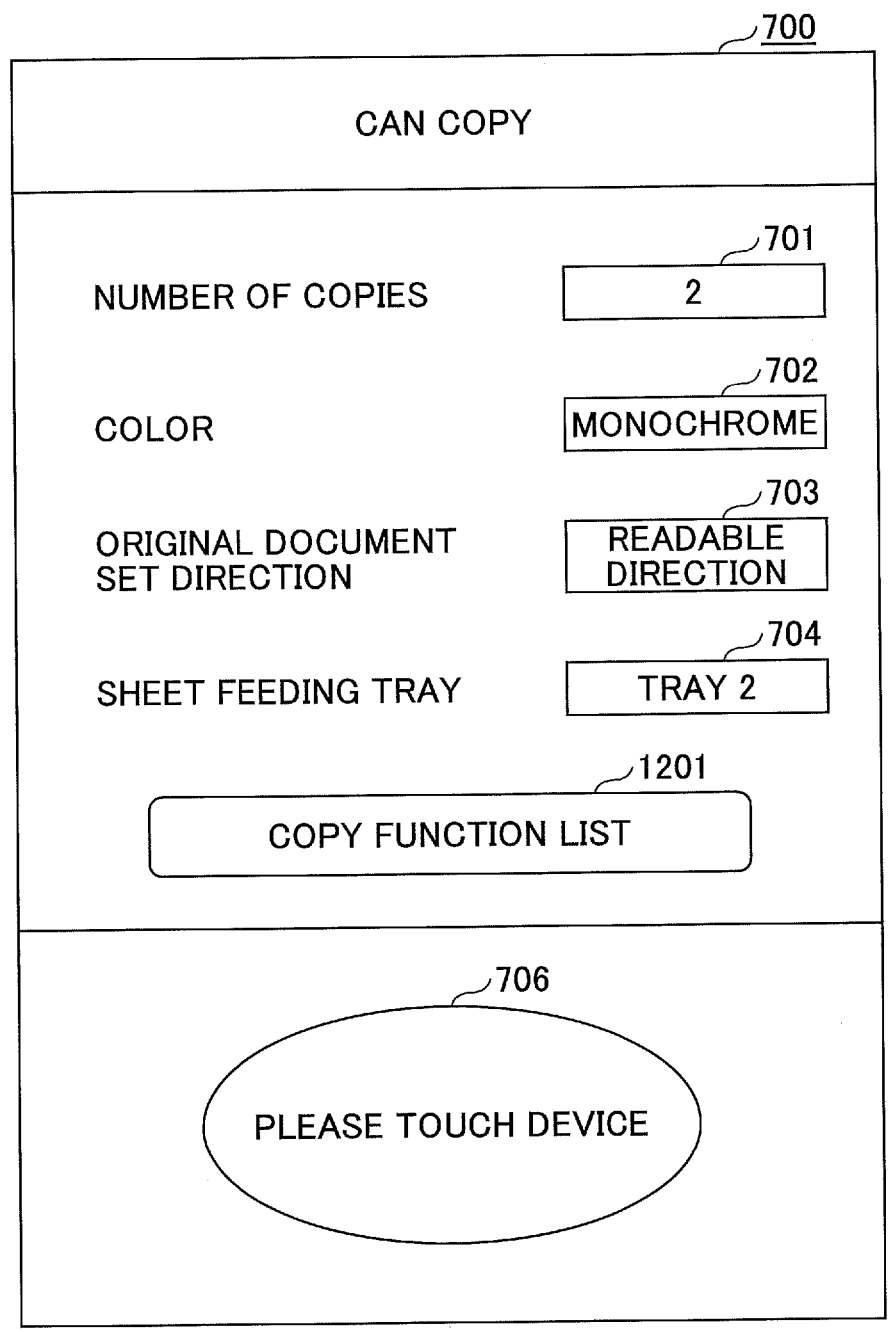
FIG. 13 illustrates an example of a setting screen for basic functions according to the second embodiment.

FIG. 13 illustrates an example of a setting screen for basic functions according to the second embodiment. The setting screen for basic functions 700 according to the present embodiment includes a "copy function list" button 1201, instead of the field for setting the usage of detailed setting functions 705 according to the first embodiment illustrated in FIG. 7. The user 103 presses (touches) this button to set the function list as being effective, when the user 103 wants to display a list of functions available in the image forming apparatus 101. Note that the "copy function list" button 1201 is an example of a button for setting the function list as being effective. For example, when the scan function is selected in the function selection screen 600 illustrated in FIG. 6, a "scan function list" button is displayed, instead of the "copy function list" button 1201.

Referring back to FIG. 12, the description of the flowchart is continued.

In step S1203, the user 103 brings the information terminal 102 close to the short range radio communication unit 406 of the image forming apparatus 101. Accordingly, on the display input unit 419 of the information terminal 102, a function list screen described below is displayed.

In step S1204, the user 103 selects a function for making detailed settings, from the function list screen displayed on the display input unit 419 of the information terminal 102. Accordingly, on the display input unit 419 of the information terminal 102, a detailed setting screen relevant to the selected function is displayed.

In step S1205, the user 103 sets (inputs) setting information in the detailed setting screen displayed on the display input unit 419.

When the user 103 finishes making settings of the detailed setting information, in step S1206, the user 103 presses the start button. By this operation, image processing by the image forming apparatus 101 is started.

Figure 14:
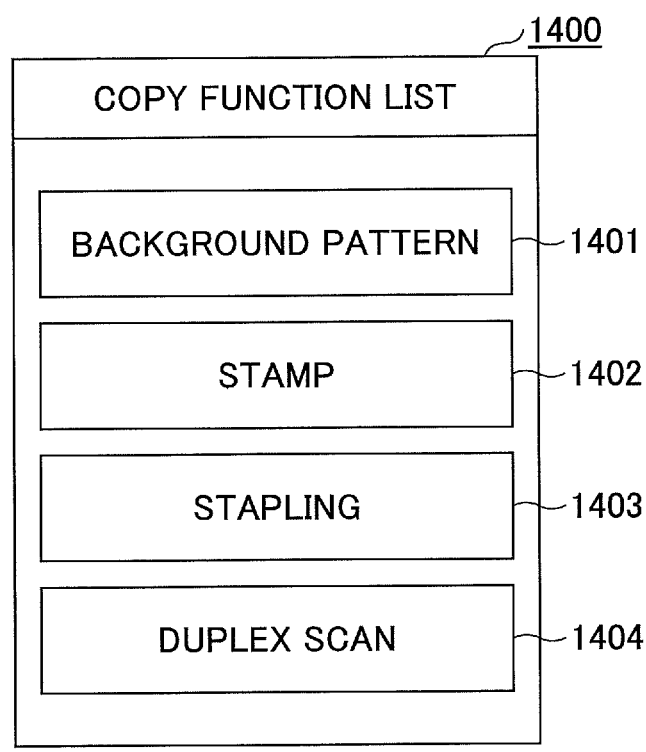
FIG. 14 illustrates an example of a function list screen according to the second embodiment.

FIG. 14 illustrates an example of a function list screen according to the second embodiment. A function list screen 1400 includes a background pattern button 1401, a stamp button 1402, a stapling button 1403, a duplex scan button 1404, etc., corresponding to the functions available in the image forming apparatus 101. For example, when the user 103 wants to set a stamp function, the user 103 can call a detailed setting screen relevant to the stamp, by pressing (touching) the stamp button 1402. Note that the buttons displayed in the function list screen 1400 of FIG. 14 are merely examples. The buttons displayed in the function list screen 1400, correspond to the functions that can be set according to the equipment configuration such as the model, the installed options, etc., of the image forming apparatus 101.

Figure 15:
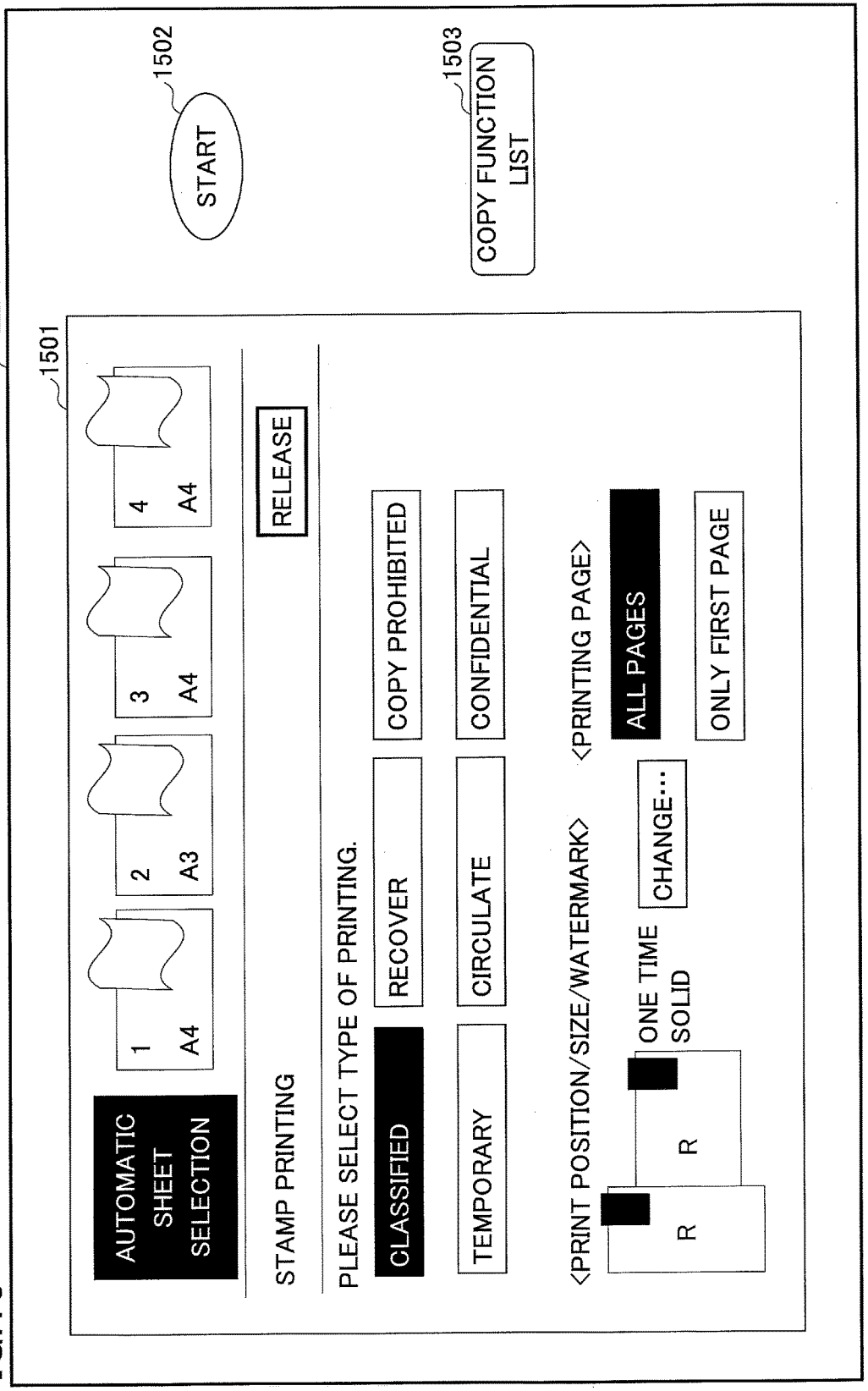
FIG. 15 illustrates an example of a setting screen for detailed functions according to the second embodiment.

FIG. 15 illustrates an example of a setting screen for detailed functions according to the second embodiment. In FIG. 15, a setting screen for detailed functions 1500 includes an operation screen 1501, a start button 1502, a copy function list button 1503, etc.

The operation screen 1501 is assumed to be, for example, an operation screen that is displayed on the display input unit 408 (for example, an operation panel of the MFP, etc.) of the image forming apparatus 101. In the example of FIG. 15, as an example of the operation screen 1501, an operation screen 1501 for making settings relevant to the stamp is displayed. By touching the respective parts of this operation screen 1501, the user 103 is able to make detailed settings of the stamp function, similar to the case of operating the display input unit 408 of the image forming apparatus 101.

The start button 1502 is a button for the user 103 to request the image forming apparatus 101 to start image processing, after making settings of the detailed functions in the operation screen 1501.

The copy function list button 1503 is used when the user 103 wants to make settings for a function other than the functions relevant to the stamp, such as duplex scan. By touching the copy function list button 1503, it is possible to return to the function list screen of FIG. 14.

Note that the usage of the setting screen for detailed functions 1500 as the setting screen of the image forming apparatus 101 as in FIG. 15 is merely one example. Also in the present embodiment, the image forming apparatus 101 may create a detailed setting screen according to the screen size, the resolution, etc., of the information terminal 102.

FIG. 16 is a sequence chart indicating an example of image processing according to the second embodiment. Note that the processes of steps S1001 through S1004 of FIG. 16 are the same as the processes according to the first embodiment illustrated in FIG. 10, and therefore the differences are mainly described below.

In step S1501, the setting information sending unit 417 of the information terminal 102 sends the setting information of basic functions (first setting information) set in step S1001, to the image forming apparatus 101, by using the connection information reported from the image forming apparatus 101. This first setting information includes information of the function (for example, copy) that the user 103 wants to use, setting information of the number of copies, setting information of color, information indicating to display a function list, etc.

In step S1502, the setting information receiving unit 402 of the image forming apparatus 101 receives the setting information of basic functions from the information terminal 102, and stores the received information in the storage unit 409, for example, as the basic setting information 413. Furthermore, when the received setting information of basic functions includes information indicating to display the function list, the setting information receiving unit 402 reports this to the function information report unit 1101.

In step S1503, the function information report unit 1101 receives the report from the setting information receiving unit 402, and sends, to the information terminal 102, function list information according to the equipment configuration of the image forming apparatus 101, based on the equipment configuration information 411, etc., stored in the storage unit 409.

In step S1504, the setting control unit 418 of the information terminal 102 causes the display input unit 419 to display, for example, the function list screen 1400 illustrated in FIG. 14, based on the function list information received from the image forming apparatus 101.

In step S1505, when the user 103 selects a function to be set from the displayed function list screen 1400, the setting control unit 418 of the information terminal 102 sends the information of the selected function (third setting information) to the image forming apparatus 101 (step S1506).

In step S1507, the setting screen selecting unit 1102 of the image forming apparatus 101 selects a setting screen for detailed functions to be displayed on the information terminal 102, from the setting screen information 1103 stored in the storage unit 409, based on the information of the function received from the information terminal 102.

In step S1508, the setting screen providing unit 404 of the image forming apparatus 101 sends, to the information terminal 102, the setting screen for detailed functions 1500 selected by the setting screen selecting unit 1102.

In step S1509, the setting control unit 418 of the information terminal 102 causes the display input unit 419 to display the setting screen for detailed functions 1500 transferred from the image forming apparatus 101.

In step S1510, the user 103 makes settings of detailed functions in the setting screen for detailed functions 1500, and presses the start button 1502 (step S1511).

In step S1512, the information terminal 102 sends, the setting information (second setting information) set in the setting screen for detailed functions 1500, and the information such as a request to execute image processing made by pressing the start button 1502, to the image forming apparatus 101.

In step S1513, the image processing unit 405 of the image forming apparatus 101 executes image processing based on the basic setting information 413 (first setting information)

stored in the storage unit 409, and detailed setting information (second setting information) set in the setting screen for detailed functions 1500.

Through the above processes, the image forming apparatus 101 is able to transfer, to the information terminal 102, a detailed setting screen relevant to a function selected from the list of functions available in the image forming apparatus 101, when there are many setting items of detailed functions available in the image forming apparatus 101. Furthermore, as illustrated in FIG. 15, it will become possible to use the setting screen of the image forming apparatus 101 as the setting screen for detailed functions 1500.

Note that the process of FIG. 16 is one example. For example, in the setting screen for detailed functions 1500, the user 103 may bring the information terminal 102 close to the short range radio communication unit 406 of the image forming apparatus 101, instead of pressing the start button 1502, to request the image forming apparatus 101 to start image processing.

Furthermore, in step S1505 of FIG. 16, a plurality of functions may be selected from the displayed function list screen 1400. In this case, a button for switching between a plurality of operation screens 1501 may be displayed in the setting screen for detailed functions 1500 displayed in step S1509, so that it is possible to switch between a plurality of operation screens 1501.

Furthermore, the image processing apparatus may be a projector, an electronic blackboard, etc., in addition to a multifunction peripheral, a printer, a scanner, etc.

<Overview>

An image processing apparatus (101) according to the present embodiment includes a receiving unit (402) configured to receive first setting information from an information terminal (102); a providing unit (404) configured to provide a setting screen (800) for setting second setting information to the information terminal (102), based on the received first setting information; and an image processing unit (405) configured to execute image processing based on the received first setting information and the second setting information set by the setting screen (800).

With the above configuration, the image processing apparatus (101) provides a setting screen for setting second setting information to the information terminal 102, based on the first setting information received from the information terminal 102. Accordingly, the application of the information terminal 102 does not need to include a setting screen for setting the second setting information or setting information, etc. Furthermore, even when a new model is released, there is no need to add new functions or information of a setting screen, etc., to the application.

Therefore, according to the image processing apparatus (101) according to the present embodiment, it is possible to increase the convenience of using detailed functions according to the equipment configuration of the image processing apparatus (101), from an information terminal 102 such as a smart device, etc.

The above reference numerals in parenthesis are appended only for facilitating understanding, and are only examples. The reference numerals should not be construed as limiting the scope of the present invention.

According to one embodiment of the present invention, an image processing apparatus, an image processing system, and an image processing method are provided, which are capable of increasing the convenience of using detailed functions according to the equipment configuration of an image processing apparatus, from an information terminal such as a smart device, etc.

The image processing apparatus, the image processing system, and the image processing method are not limited to the specific embodiments described herein, and variations and modifications may be made without departing from the spirit and scope of the present invention.

The present application is based on and claims the benefit of priority of Japanese Priority Patent Application No. 2015-049286, filed on Mar. 12, 2015, the entire contents of which are hereby incorporated herein by reference.

What is claimed is:

1. An image processing apparatus comprising:
a memory that is configured to store a program;
a first processor that is configured to execute the program so as to perform a method including the steps of:
receiving first setting information including setting information for a basic image processing function and information indicating whether to edit detail function at an information terminal from the information terminal;
generating a setting screen to be displayed by the information terminal for setting second information indicating the detail function that is different from the basic image processing function;
sending the setting screen for setting the second setting information to the information terminal if the information indicates to edit the detail function; and
executing image processing based on the received first setting information and the second setting information set by the setting screen.

2. The image processing apparatus according to claim 1, wherein
the second setting information includes setting information according to an equipment configuration of the image processing apparatus.

3. The image processing apparatus according to claim 1, wherein
the second setting information includes setting information of stapling or setting information of duplex processing.

4. The image processing apparatus according to claim 1, wherein
the first setting information includes setting information common to another image processing apparatus.

5. The image processing apparatus according to claim 1, wherein
the first setting information indicates whether to edit setting information of a number of copies or setting information of a color.

6. The image processing apparatus according to claim 1, wherein
the first setting information includes information relating to a display screen for displaying the setting screen by the information terminal.

7. The image processing apparatus according to claim 1, further comprising:
a creating unit configured to create the setting screen based on the first setting information.

8. The image processing apparatus according to claim 1, wherein the method further includes:
reporting information of a function according to an equipment configuration of the image processing apparatus to the information terminal, based on the first setting information, wherein
when the receiving step receives third setting information for selecting at least one of the functions according to the equipment configuration of the image processing apparatus from the information terminal, the sending step provides the setting screen for setting the second setting information to the information terminal, based on the first setting information and the third setting information received by the receiving step.

9. The image processing apparatus according to claim 1, wherein the method further includes:
reporting connection information of the image processing apparatus to the information terminal, via short range radio communication.

10. An image processing system comprising:
the image processing apparatus according to claim 1; and
a second processor configured to execute a program that causes the information terminal to:
  display a first setting screen,
    send the first setting information set in the first setting screen to the image processing apparatus, and
    display a second setting screen provided from the image processing apparatus based on the first setting information, and receive a setting of the second setting information set in the second setting screen.

11. The image processing apparatus according to claim 1, wherein
the generated setting screen is configured to gray out a field for setting information of a function that is not available at the image processing apparatus based on the received first setting information.

12. The image processing apparatus according to claim 1, wherein the method further includes reporting connection information of the image processing apparatus to the information terminal, via short range radio communication before the image processing apparatus receives the first setting information from an information terminal.

13. The image processing apparatus according to claim 1, wherein the setting screen includes a field for a setting for usage of detailed setting functions.

14. The image processing apparatus according to claim 13, wherein the method includes:
receiving third setting information indicating whether to edit setting for the usage of the detailed setting functions at the information terminal from the information terminal;
generating another setting screen to be displayed by the information terminal for changing the setting for the usage of the detailed setting functions based on the third setting information;
sending the another setting screen to the information terminal, based on the received third setting information; and
executing the image processing further based on the received setting for the usage of the detailed setting functions.

15. The image processing apparatus according to claim 1, wherein the method further includes:
generating the setting screen based on the setting information for the basic image processing function.

16. An image processing method comprising:
receiving first setting information including setting information for a basic image processing function and information indicating whether to edit detail function at an information terminal from the information terminal;
generating a setting screen to be displayed by the information terminal for setting second information indicating the detail function that is different from the basic image processing function;
sending the setting screen for setting the second setting information to the information terminal if the information indicates to edit the detail function; and
executing image processing based on the received first setting information and the second setting information set by the setting screen.

* * * * *